(12) United States Patent
Choi et al.

(10) Patent No.: US 9,929,925 B2
(45) Date of Patent: Mar. 27, 2018

(54) APPARATUS AND METHOD FOR DETECTING COUNTERFEIT ADVERTISER IN WIRELESS COMMUNICATION SYSTEM

(71) Applicant: Samsung Electronics Co., Ltd., Suwon-si, Gyeonggi-do (KR)

(72) Inventors: Dae-Kyu Choi, Suwon-si (KR); Sin-Seok Seo, Seongnam-si (KR); Ki-Seok Lee, Yongin-si (KR); Do-Hy Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/400,259

(22) Filed: Jan. 6, 2017

(65) Prior Publication Data
US 2017/0201441 A1 Jul. 13, 2017

(30) Foreign Application Priority Data
Jan. 8, 2016 (KR) ........................ 10-2016-0002889

(51) Int. Cl.
| | |
|---|---|
| H04M 1/66 | (2006.01) |
| H04M 1/68 | (2006.01) |
| H04M 3/16 | (2006.01) |
| H04L 12/26 | (2006.01) |
| H04W 4/00 | (2018.01) |

(52) U.S. Cl.
CPC ........ *H04L 43/0852* (2013.01); *H04L 43/106* (2013.01); *H04W 4/008* (2013.01)

(58) Field of Classification Search
CPC .. H04W 12/10; H04W 12/12; G06Q 30/0185; H04L 43/106

USPC .......................................... 455/410
See application file for complete search history.

(56) References Cited

U.S. PATENT DOCUMENTS

| | | | |
|---|---|---|---|
| 9,491,588 B1* | 11/2016 | Biehl | .................... H04W 4/043 |
| 2003/0185244 A1* | 10/2003 | Wu | ........................ H04L 63/10 370/503 |
| 2006/0239218 A1 | 10/2006 | Weis et al. | |

(Continued)

FOREIGN PATENT DOCUMENTS

KR 10-2015-0012154 A 2/2015

OTHER PUBLICATIONS

"iBeacon security: understanding the risks", Reality matters, The Estimate Team Blog, Dec. 9, 2014.

*Primary Examiner* — Simon Nguyen
(74) *Attorney, Agent, or Firm* — Jefferson IP Law, LLP

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method for detecting a counterfeit advertiser by a server includes detecting a random delay time or a cumulative interval for a reference device based on a time stamp for an advertisement packet received from the reference device, and detecting a random delay time or a cumulative interval for a receiving device other than the reference device based on a time stamp for an advertisement packet received from the receiving device.

20 Claims, 18 Drawing Sheets

(56) References Cited

U.S. PATENT DOCUMENTS

| | | | |
|---|---|---|---|
| 2008/0002882 A1* | 1/2008 | Voloshynovskyy | G07D 7/005 382/181 |
| 2009/0083184 A1 | 3/2009 | Eisen | |
| 2009/0287561 A1* | 11/2009 | Rybak | G06Q 30/02 705/14.26 |
| 2013/0092731 A1* | 4/2013 | Pettersson | G06K 19/08 235/375 |
| 2013/0198046 A1 | 8/2013 | Hammad et al. | |
| 2014/0133656 A1 | 5/2014 | Wurster et al. | |
| 2014/0222574 A1 | 8/2014 | Emigh et al. | |
| 2015/0106282 A1* | 4/2015 | Lee | G06Q 10/087 705/318 |
| 2015/0134552 A1* | 5/2015 | Engels | G06Q 30/0185 705/318 |
| 2015/0271194 A1* | 9/2015 | Szucs | H04L 63/0869 726/23 |
| 2016/0007289 A1 | 1/2016 | Weizman et al. | |
| 2016/0299213 A1* | 10/2016 | Jones | G01S 5/08 |
| 2016/0314474 A1* | 10/2016 | Schibi | G06Q 30/018 |

\* cited by examiner

APPARATUS AND METHOD FOR DETECTING COUNTERFEIT ADVERTISER IN WIRELESS COMMUNICATION SYSTEM

CROSS-REFERENCE TO RELATED APPLICATION(S)

This application claims the benefit under 35 U.S.C. § 119(a) of a Korean patent application filed on Jan. 8, 2016 in the Korean Intellectual Property Office and assigned Serial number 10-2016-0002889, the entire disclosure of which is hereby incorporated by reference.

TECHNICAL FIELD

The present disclosure relates to an apparatus and method for detecting a counterfeit advertiser in a wireless communication system. More particularly, the present disclosure relates to an apparatus and method for detecting a counterfeit advertiser based on a random delay time.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Machine type communication is rapidly evolving from an M2M communication concept which supports communication between people and things, or between things, based on a mobile communication network into a concept of interacting with all information of real and virtual worlds as well as things while extending its area to the Internet. Namely, the M2M communication that enables the intelligent communication between people and things, or between things, at anytime and anywhere in real time in a stable and convenient manner is extending its area to IoT while connecting all surrounding things through the Internet.

The IoT refers to a technology of connecting various types of things, which have a sensor and a communication function embedded therein, to the Internet. Here, the things include various embedded systems (a computer system of an electronic device such as a smart phone), such as home appliances, a mobile device, wearable computers, etc. The things connected to the IoT have to be connected to an internet based on a unique internet protocol (IP) address by which the things can be identified, and may have sensors embedded therein for acquiring information from an external environment.

Recently, IoT has been rapidly developed, so a Bluetooth scheme, specially, a Bluetooth scheme which supports a Bluetooth low energy (BLE) mode has been attracted. Generally, a user may control devices to which a BLE mode is applied using a portable terminal, e.g., a smart phone, so devices to which a BLE mode is applied has been increased.

In a wireless communication system, e.g., a wireless communication system supporting a Bluetooth scheme, a unique signal of a BLE advertiser, e.g., a BLE advertisement packet, e.g., a beacon signal, is not encrypted, and is transmitted through a published channel. So, in the wireless communication system supporting the Bluetooth scheme, any device may receive a BLE advertisement packet transmitted by the BLE advertiser, and analyze the received BLE advertisement packet.

So, an attacker may receive, copy and store a BLE advertisement packet transmitted by a BLE advertiser, and transmit the BLE advertisement packet of the BLE advertiser. That is, in a wireless communication system supporting the Bluetooth scheme, an attacker may easily generate a counterfeit BLE advertiser.

For example, in a current BLE standard, a BLE advertiser transmits a medium access control (MAC) address of the BLE advertiser along with a BLE advertisement packet. In a case that the BLE advertiser uses the same MAC address whenever transmitting a BLE advertisement packet, an attacker may easily generate a counterfeit BLE advertiser. Further, it is possible to identify the BLE advertiser using the MAC address transmitted along with the BLE advertisement packet, so there is a high probability of infringement of privacy.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for detecting a counterfeit advertiser in a wireless communication system.

Another aspect of the present disclosure is to provide an apparatus and method for detecting a counterfeit advertiser thereby enhancing security in a wireless communication system.

Another aspect of the present disclosure is to provide an apparatus and method for detecting a counterfeit advertiser based on random delay time in a wireless communication system.

Another aspect of the present disclosure is to provide an apparatus and method for detecting a counterfeit advertiser based on a time stamp in a wireless communication system.

Another aspect of the present disclosure is to provide an apparatus and method for detecting a counterfeit advertiser without changing a format of an existing advertisement packet in a wireless communication system.

In accordance with an aspect of the present disclosure, a method for detecting a counterfeit advertiser by a server in a wireless communication system is provided. The method comprises detecting a random delay time or a cumulative interval for a reference device based on a time stamp for an advertisement packet which is received from the reference device, detecting a random delay time or a cumulative interval for a receiving device other than the reference device based on a time stamp for an advertisement packet which is received from the receiving device, and determining whether an advertiser which broadcasts the advertisement packet received from the receiving device is a counterfeit advertiser based on the random delay time for the reference device and the random delay time for the receiving device, or determining whether the advertiser which broadcasts the advertisement packet received from the receiving device is a counterfeit advertiser based on the cumulative interval for the reference device and the cumulative interval for the receiving device.

In accordance with another aspect of the present disclosure, an operating method of a reference device in a wireless communication system is provided. The operating method includes receiving an advertisement packet broadcasted by an original advertiser, and transmitting the advertisement packet and a time stamp for the advertisement packet to a server.

In accordance with another aspect of the present disclosure, an operating method of a receiving device in a wireless communication system is provided. The operating method includes receiving an advertisement packet broadcasted by an advertiser, transmitting the advertisement packet and a time stamp for the advertisement packet to a server, and receiving a counterfeit alert packet alerting that the advertiser is a counterfeit advertiser from the server.

In accordance with another aspect of the present disclosure, an operating method of an original advertiser in a wireless communication system is provided. The operating method includes broadcasting an advertisement packet to cause a reference scanner which receives the advertisement packet to transmit the advertisement packet and a time stamp for the advertisement packet to a server.

In accordance with another aspect of the present disclosure, a server in a wireless communication system is provided. The server includes at least one processor configured to: detect a random delay time or a cumulative interval for a reference device based on a time stamp for an advertisement packet which is received from the reference device, detect a random delay time or a cumulative interval for a receiving device other than the reference device based on a time stamp for an advertisement packet which is received from the receiving device, determine whether an advertiser which broadcasts the advertisement packet received from the receiving device is a counterfeit advertiser based on the random delay time for the reference device and the random delay time for the receiving device, or determine whether the advertiser which broadcasts the advertisement packet received from the receiving device is a counterfeit advertiser based on the cumulative interval for the reference device and the cumulative interval for the receiving device.

In accordance with another aspect of the present disclosure, a reference device in a wireless communication system is provided. The reference device comprises a receiver, a transmitter, and at least one processor configured to control the receiver to receive an advertisement packet broadcasted by an original advertiser, and control the transmitter to transmit the advertisement packet and a time stamp for the advertisement packet to a server.

In accordance with another aspect of the present disclosure, a receiving device in a wireless communication system is provided. The receiving device comprises a receiver, a transmitter, and at least one processor configured to control the receiver to receive an advertisement packet broadcasted by an advertiser, control the transmitter to transmit the advertisement packet and a time stamp for the advertisement packet to a server, and control the receiver to receive a counterfeit alert packet alerting that the advertiser is a counterfeit advertiser from the server.

In accordance with another aspect of the present disclosure, an original advertiser in a wireless communication system is provided. The original advertiser includes a processor configured to broadcast an advertisement packet to cause a reference scanner which receives the advertisement packet to transmit the advertisement packet and a time stamp for the advertisement packet to a server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
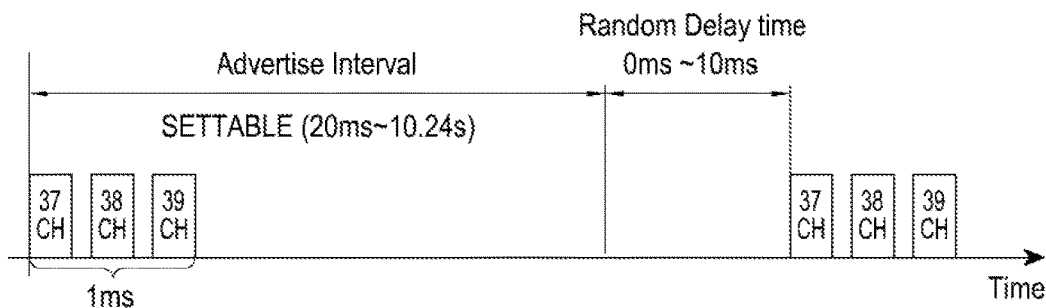
FIG. 1A schematically illustrates an operation of transmitting a Bluetooth low energy (BLE) advertisement packet in a BLE advertiser in a wireless communication system supporting a Bluetooth scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital versatile disc (DVD) player, an audio, a refrigerator, an air conditioner, a vacuum cleaner, an oven, a microwave oven, a washer, a dryer, an air purifier, a set-top box, a television (TV) box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus and method for detecting a counterfeit advertiser in a wireless communication system.

An embodiment of the present disclosure proposes an apparatus and method for detecting a counterfeit advertiser thereby enhancing security in a wireless communication system.

An embodiment of the present disclosure proposes an apparatus and method for detecting a counterfeit advertiser based on random delay time in a wireless communication system.

An embodiment of the present disclosure proposes an apparatus and method for detecting a counterfeit advertiser based on a time stamp in a wireless communication system.

An embodiment of the present disclosure proposes an apparatus and method for detecting a counterfeit advertiser without changing a format of an existing advertisement packet in a wireless communication system.

According to various embodiments of the present disclosure, for example, a counterfeit advertiser and a reference device may be an electronic device.

According to various embodiments of the present disclosure, for example, a signal transmitting apparatus may be a counterfeit advertiser, a reference device, a server, a scanner, and the like.

According to various embodiments of the present disclosure, for example, a signal receiving apparatus may be a counterfeit advertiser, a reference device, a server, a scanner, and the like.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

For convenience, in an embodiment of the present disclosure, it will be assumed that a wireless communication system supports a Bluetooth scheme, e.g., a Bluetooth low energy (BLE) mode. Further, it will be understood by those of ordinary skill in the art that an apparatus and method proposed in embodiments of the present disclosure is not limited to a Bluetooth scheme and a BLE mode.

A process which may be used for detecting a counterfeit BLE advertiser among processes defined in a current BLE standard is only a process which uses a private address. In the current BLE standard, a BLE advertiser transmits a signal, e.g., a BLE advertisement packet, e.g., a beacon signal along with a medium access control (MAC) address of the BLE advertiser.

An operation of transmitting a BLE advertisement packet in a BLE advertiser in a wireless communication system supporting a Bluetooth scheme according to an embodiment of the present disclosure will be described with reference to FIGS. 1A and 1B.

FIG. 1A schematically illustrates an operation of transmitting a BLE advertisement packet in a BLE advertiser in a wireless communication system supporting a Bluetooth scheme according to an embodiment of the present disclosure.

Referring to FIG. 1A, the wireless communication system supporting the Bluetooth scheme uses a plurality of BLE channels. For example, the BLE channels include 40 channels, i.e., advertising channels and data channels.

The advertising channels include N advertising channels, e.g., three advertising channels, e.g., an advertising channel 37, an advertising channel 38, and an advertising channel 39, and are used for discovering a service or/and a device. The advertising channel 37 is a 2402 MHz channel, the advertising channel 38 is a 2426 MHz channel, and the advertising channel 39 is a 2480 MHz channel. The advertising channels are set per a certain advertise interval. For example, in a current BLE standard, the advertise interval may be set to one of values from 20 milliseconds to 10.24 seconds. The advertising channels, i.e., the advertising channel 37, the advertising channel 38, and the advertising channel 39 occupy a time resource of about 1 msec. There may be random delay time after the advertising interval. In the current BLE standard, the random delay time may be tolerated up to 0~10 milliseconds. The random delay time is time added for preventing transmission collision among successive signals.

The data channels include M data channels, e.g., 37 data channels, e.g., a data channel 0 to a data channel 36, and are used for transmitting and receiving data traffic. The data channel 0 to the data channel 36 go from a 2404 MHz channel to 2478 MHz except for a 2426 MHz channel, respectively.

In the wireless communication system, a BLE advertiser transmits a signal, e.g., BLE advertisement packet, e.g., a beacon signal along with a MAC address of the BLE advertiser.

If a BLE advertiser uses the same MAC address whenever transmitting a BLE advertisement packet, the BLE advertiser may be identified using the MAC address, so there is a probability of infringement of privacy.

Like this, if the BLE advertiser uses the same MAC address whenever transmitting the BLE advertisement packet, an attacker may easily generate a counterfeit BLE advertiser. Since the BLE advertiser may be identified using the MAC address transmitted along with the BLE advertisement packet, there is a high probability of infringement of privacy.

For preventing this situation, a wireless communication system supporting a Bluetooth scheme randomly selects a MAC address which is used for transmitting a BLE advertisement packet by a certain period, and sets the randomly selected MAC address to a private address.

If a receiving device, i.e., a peer device, is capable of knowing a private address which is used by a BLE advertiser, i.e., an original BLE advertiser, not a counterfeit BLE advertiser at time at which a BLE advertisement packet, e.g., a beacon signal, is received, the peer device may determine whether the received BLE advertisement packet is transmitted by the counterfeit BLE advertiser.

An operation of transmitting a BLE advertisement packet in a BLE advertiser in a wireless communication system supporting a Bluetooth scheme according to an embodiment of the present disclosure has been described with reference to FIG. 1A, and a format of a BLE advertisement packet in a wireless communication system supporting a Bluetooth scheme according to an embodiment of the present disclosure will be described with reference to FIG. 1B.

Figure 1B:
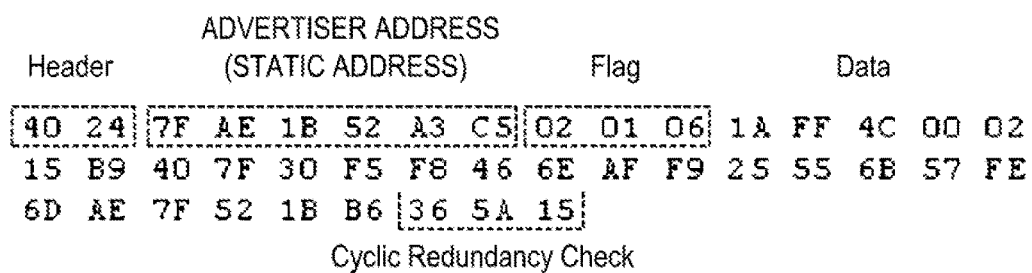
FIG. 1B schematically illustrates a format of a BLE advertisement packet in a wireless communication system supporting a Bluetooth scheme according to an embodiment of the present disclosure.

FIG. 1B schematically illustrates a format of a BLE advertisement packet in a wireless communication system supporting a Bluetooth scheme according to an embodiment of the present disclosure.

Referring to FIG. 1B, the BLE advertisement packet includes a header field, an advertiser address field, a flag field, a data field, and a cyclic redundancy check (CRC) field.

The header field includes a description for the BLE advertisement packet. The header field includes fixed information.

The advertiser address field includes an address of a BLE advertiser, and may be changed to a random value by a certain period. The address which is changed to the random value, i.e., a random address, is an address which is generated by applying a random value to a static value, e.g., a public address. The public address denotes a hardware MAC address.

The random address may be one of a static address, a non-resolvable private address, and a resolvable private address.

The static address is a random MAC address which is generated when a BLE advertiser powers on, and has a static value.

The non-resolvable private address is a random MAC address which is periodically generated, and a peer device may not detect an actual address of a BLE advertiser. The non-resolvable private address may be used only in a case of reconnection after paging.

The resolvable private address is a random MAC address which is periodically generated, and a peer device may detect an actual address of a BLE advertiser based on the random MAC address and a link key. The resolvable private address may be used only in a case of reconnection after paging.

A current wireless communication system supporting a Bluetooth scheme uses an address of the BLE advertiser as a static value, e.g., a public address.

The flag field includes a description for the data field. The flag field includes static information.

The data field includes unique information used for identifying the BLE advertiser. The data field includes static information. The unique information includes a universal unique identifier (UUID), a major code, and a minor code.

A format of a BLE advertisement packet in a wireless communication system supporting a Bluetooth scheme according to an embodiment of the present disclosure has been described with reference to FIG. 1B, and an example of a process for detecting a counterfeit BLE advertiser in a wireless communication system supporting a Bluetooth scheme according to an embodiment of the present disclosure will be described with reference to FIG. 2.

Figure 2:
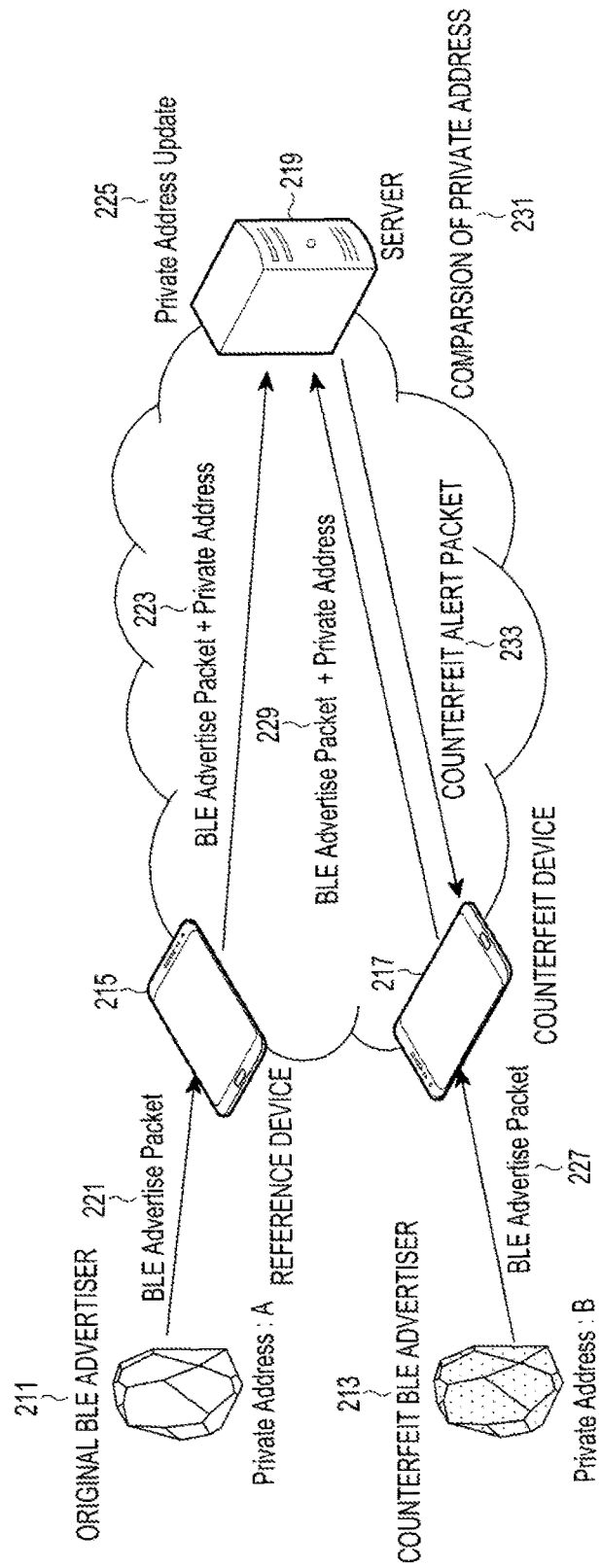
FIG. 2 schematically illustrates an example of a process for detecting a counterfeit BLE advertiser in a wireless communication system supporting a Bluetooth scheme according to an embodiment of the present disclosure.

FIG. 2 schematically illustrates an example of a process for detecting a counterfeit BLE advertiser in a wireless communication system supporting a Bluetooth scheme according to an embodiment of the present disclosure.

Referring to FIG. 2, it will be noted that a process of detecting a counterfeit BLE advertiser in FIG. 2 is a process of detecting a counterfeit BLE advertiser which is performed based on a private address.

The wireless communication system includes a plurality of BLE advertisers, e.g., an original BLE advertiser 211 and a counterfeit BLE advertiser 213, a plurality of receiving devices, e.g., a reference device 215 and a counterfeit device 217, and a server 219. The counterfeit BLE advertiser 213 is an attacker, and denotes a BLE advertiser which broadcasts a counterfeit BLE advertisement packet. The reference device 215 is a device which satisfies a preset criterion, and it will be assumed that the reference device 215 may receive a BLE advertisement packet broadcasted by the original BLE advertiser 211. The preset criterion may be determined as appropriate for a situation of the wireless communication system, this will be described below, so a detailed description thereof will be omitted herein.

The original BLE advertiser 211 uses a private address which has a random value, and the private address is changed per a certain period. Referring to FIG. 2, it will be assumed that the private address of the original BLE advertiser 211 is determined as 'A'. The original BLE advertiser 211 broadcasts a BLE advertisement packet at operation 221. The reference device 215 receives the BLE advertisement packet broadcasted by the original BLE advertiser 211, and transmits the received BLE advertisement packet to the server 219 at operation 223.

After receiving the BLE advertisement packet from the reference device 215, the server 219 stores or updates the private address of the original BLE advertiser 211 included in the BLE advertisement packet at operation 225.

The counterfeit BLE advertiser 213 uses a counterfeit private address, and it will be assumed that the private address of the counterfeit BLE advertiser 213 is determined as 'B' in FIG. 2. The counterfeit BLE advertiser 213 broadcasts a BLE advertisement packet including the private address 'B' at operation 227. The counterfeit device 217 receives a BLE advertisement packet broadcasted by the counterfeit BLE advertiser 213, and transmits the received BLE advertisement packet to the server 219 at operation 229.

After receiving the BLE advertisement packet from the counterfeit device 217, the server 219 compares the private address of the counterfeit BLE advertiser 213 included in the BLE advertisement packet and a private address stored at the server 219 at operation 231. If the stored private address is not identical to the private address of the counterfeit BLE advertiser 213, the server 219 detects the counterfeit BLE advertiser 213 as a counterfeit BLE advertiser, and transmits a counterfeit alert packet to the counterfeit device 217 at operation 233. A counterfeit alert packet is a packet alerting that a BLE advertiser from which a device receives a BLE advertisement packet is a counterfeit BLE advertiser.

As described above, in a case that a BLE advertiser uses a private address, a probability that counterfeit BLE advertiser may be detected increases compared to a case that the BLE advertiser does not use the private address.

However, in order for the BLE advertiser to use a private address, a pairing process needs to be performed between the BLE advertiser and a receiving device in advance. The pairing process requires a security process for the pairing process, and it may be inconvenient that the BLE advertiser and the receiving device are used due to the pairing process.

The private address which is used by the BLE advertiser is changed by a certain period, e.g., a period of minutes, and the BLE advertiser may be counterfeited during change of the private address.

The private address used by the BLE advertiser is generated using a random value generating function with a relatively high calculation cost, so calculation cost thereof may be load to the BLE advertiser.

So, an embodiment of the present disclosure an apparatus and method for detecting a counterfeit BLE advertiser thereby detecting the counterfeit BLE advertiser without changing a format of a BLE advertisement packet which is currently used in a wireless communication system supporting a Bluetooth scheme. More particular, an embodiment of the present disclosure proposes an apparatus and method for detecting a counterfeit BLE advertiser based on random delay time.

Another example of a process for detecting a counterfeit BLE advertiser in a wireless communication system supporting a Bluetooth scheme according to an embodiment of the present disclosure will be described with reference to FIG. 3.

Figure 3:
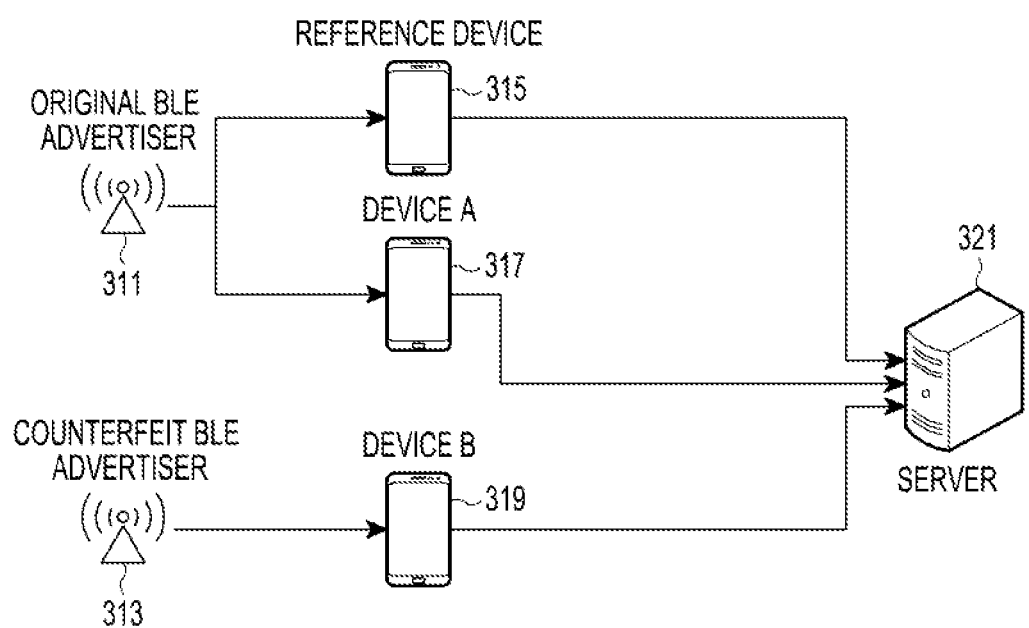
FIG. 3 schematically illustrates another example of a process for detecting a counterfeit BLE advertiser in a wireless communication system supporting a Bluetooth scheme according to an embodiment of the present disclosure.

FIG. 3 schematically illustrates another example of a process for detecting a counterfeit BLE advertiser in a wireless communication system supporting a Bluetooth scheme according to an embodiment of the present disclosure.

Referring to FIG. 3, it will be assumed that a process for detecting a counterfeit BLE advertiser in FIG. 3 is a process for detecting a counterfeit BLE advertiser which is performed by considering devices which may receive a BLE advertisement packet such as a smart phone.

The wireless communication system includes a plurality of BLE advertisers, e.g., an original BLE advertiser 311 and a counterfeit BLE advertiser 313, a plurality of receiving devices, e.g., a reference device 315, a device A 317, and a device B 319, and a server 321.

The counterfeit BLE advertiser 313 is an attacker, and denotes a BLE advertiser which broadcasts a counterfeit BLE advertisement packet. The reference device 315 is a device which satisfies a preset criterion, and it will be assumed that the reference device 315 may receive a BLE advertisement packet broadcasted by the original BLE advertiser 311. The preset criterion may be determined as appropriate for a situation of the wireless communication system, this will be described below, so a detailed description thereof will be omitted herein.

The original BLE advertiser 311 broadcasts a BLE advertisement packet. The original BLE advertiser 311 broadcasts the BLE advertisement packet for determining whether there are devices.

Each of the reference device 315 and the device A 317 receives the BLE advertisement packet broadcasted by the original BLE advertiser 311, and stores a time stamp for the BLE advertisement packet. The time stamp is a value related to time at which the BLE advertisement packet is received, the time stamp will be described below, and a detailed description thereof will be omitted herein. Each of the reference device 315 and the device A 317 transmits the received BLE advertisement packet and the time stamp to the server 321.

After receiving the BLE advertisement packet and the time stamp from each of the reference device 315 and the device A 317, the server 321 stores the received time stamp and calculates random delay time based on the time stamp. An operation for calculating the random delay time based on the time stamp will be described below, so a detailed description thereof will be omitted herein.

The counterfeit BLE advertiser 313 receives the BLE advertisement packet broadcasted by the original BLE advertiser 311, and broadcasts the received BLE advertisement packet. The device B 319 receives the BLE advertisement packet broadcasted by the counterfeit BLE advertiser 313, and stores a time stamp for the BLE advertisement packet. The device B 319 transmits the received BLE advertisement packet and the time stamp to the server 321.

After receiving the BLE advertisement packet and the time stamp from the device B 319, the server 321 calculates random delay time based on the received time stamp.

The server 321 compares the random delay time which is calculated based on the time stamp received from the device B 319 and the random delay time which is calculated based on the time stamp received from the reference device 315. The server 321 determines whether the counterfeit BLE advertiser 313 is a counterfeit BLE advertiser based on the compared result.

A scheme for determining whether the counterfeit BLE advertiser 313 is the counterfeit BLE advertiser based on the compared result will be described below, so a detailed description thereof will be omitted herein.

If the counterfeit BLE advertiser 313 is determined as the counterfeit BLE advertiser, the server 321 transmits a counterfeit alert packet to the device B 313.

Another example of a process for detecting a counterfeit BLE advertiser in a wireless communication system supporting a Bluetooth scheme according to an embodiment of the present disclosure has been described with reference to FIG. 3, and still another example of a process for detecting a counterfeit BLE advertiser in a wireless communication system supporting a Bluetooth scheme according to an embodiment of the present disclosure will be described with reference to FIG. 4.

Figure 4:
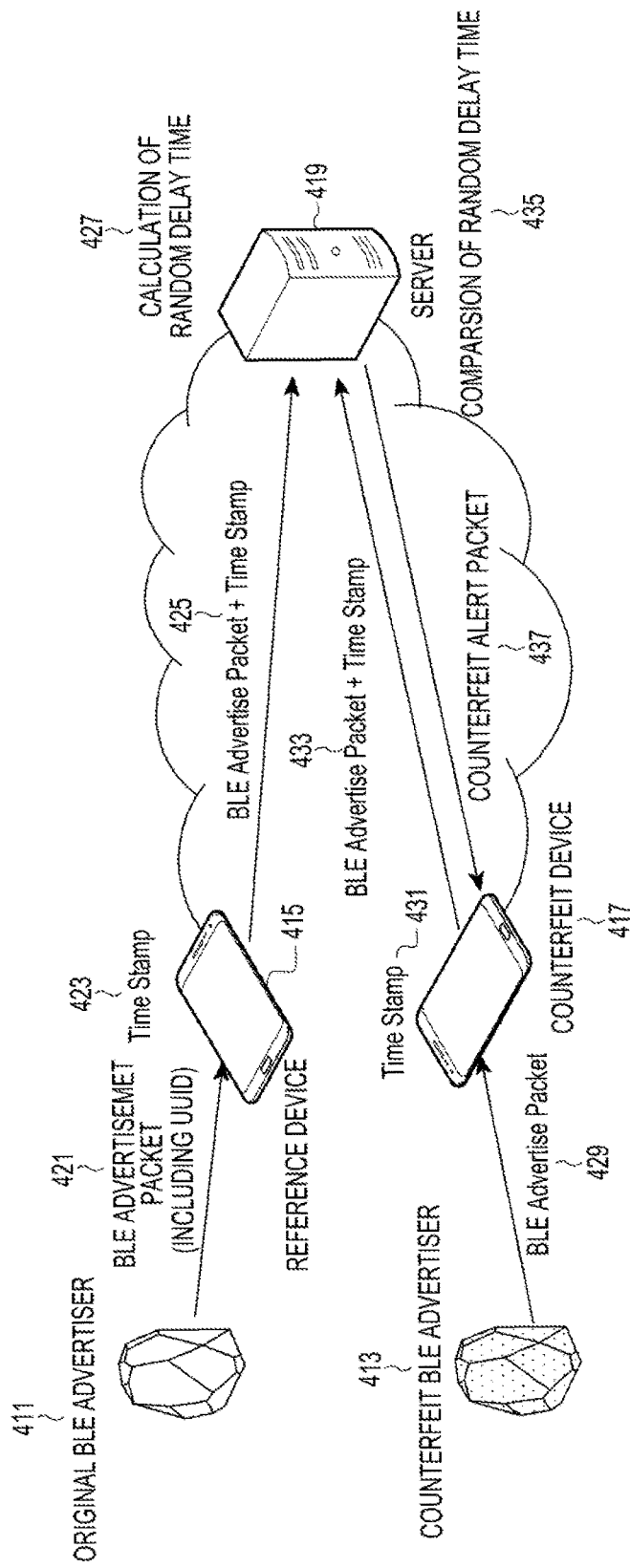
FIG. 4 schematically illustrates still another example of a process for detecting a counterfeit BLE advertiser in a wireless communication system supporting a Bluetooth scheme according to an embodiment of the present disclosure.

FIG. 4 schematically illustrates still another example of a process for detecting a counterfeit BLE advertiser in a wireless communication system supporting a Bluetooth scheme according to an embodiment of the present disclosure.

Referring to FIG. 4, it will be assumed that a process for detecting a counterfeit BLE advertiser in FIG. 4 is a process for detecting a counterfeit BLE advertiser which is performed by considering devices which may receive a BLE advertisement packet such as a smart phone.

The wireless communication system includes a plurality of BLE advertisers, e.g., an original BLE advertiser 411 and a counterfeit BLE advertiser 413, a plurality of receiving devices, e.g., a reference device 415, and a counterfeit device 417, and a server 419.

The original BLE advertiser 411 broadcasts a BLE advertisement packet at operation 421. The BLE advertisement packet includes a UUID. The reference device 415 receives the BLE advertisement packet broadcasted by the original BLE advertiser 411, and stores a time stamp for the BLE advertisement packet at operation 423. The reference device 415 transmits the received BLE advertisement packet and the time stamp for the BLE advertisement packet to the server 419 at operation 425.

After receiving the BLE advertisement packet and the time stamp from the reference device 415, the server 419 stores the time stamp received from the reference device 415 and calculates random delay time based on the time stamp at operation 427. An operation for calculating the random delay time based on the time stamp in the server 419 will be described below, so a detailed description thereof will be omitted herein.

The counterfeit BLE advertiser 413 broadcasts a counterfeit BLE advertisement packet at operation 429. The counterfeit device 417 receives the BLE advertisement packet broadcasted by the counterfeit BLE advertiser 413 and stores a time stamp for the received BLE advertisement packet at operation 431. The counterfeit device 417 transmits the received BLE advertisement packet and the time stamp for the BLE advertisement packet to the server 419 at operation 433.

After receiving the BLE advertisement packet and the time stamp from the counterfeit device 417, the server 419 stores the time stamp received from the counterfeit device 417, and calculates random delay time based on the time stamp. An operation for calculating the random delay time based on the time stamp in the server 419 will be described below, so a detailed description thereof will be omitted herein.

The server 419 compares the random delay time which is calculated based on the time stamp received from the counterfeit device 417 and the random delay time which is calculated based on the time stamp received from the reference device 415. The server 419 determines whether the counterfeit BLE advertiser 413 is a counterfeit BLE advertiser based on the compared result at operation 435. A scheme for determining whether the counterfeit BLE advertiser 413 is the counterfeit BLE advertiser based on the compared result will be described below, so a detailed description thereof will be omitted herein.

If the counterfeit BLE advertiser 413 is determined as the counterfeit BLE advertiser, the server 419 transmits a counterfeit alert packet to the counterfeit device 417 at operation 437.

Still another example of a process for detecting a counterfeit BLE advertiser in a wireless communication system supporting a Bluetooth scheme according to an embodiment of the present disclosure has been described with reference to FIG. 4, and an example of a process for determining a counterfeit BLE advertiser based on random delay time in a wireless communication system supporting a Bluetooth scheme according to an embodiment of the present disclosure will be described with reference to FIG. 5.

Figure 5:
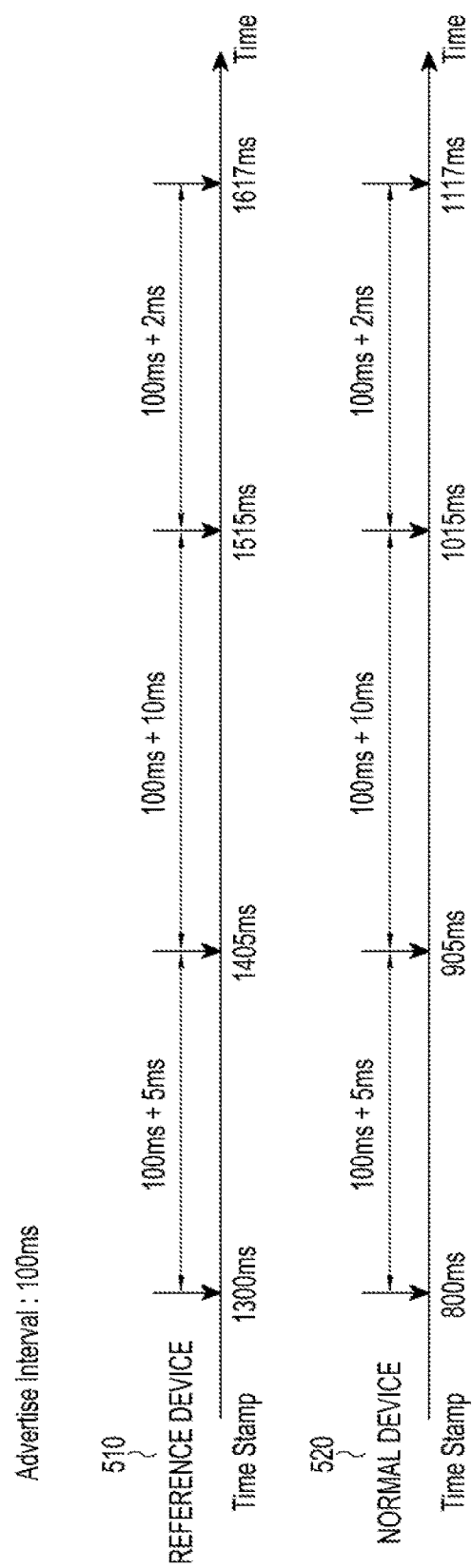
FIG. 5 schematically illustrates an example of a process for determining a counterfeit BLE advertiser based on random delay time in a wireless communication system supporting a Bluetooth scheme according to an embodiment of the present disclosure.

FIG. 5 schematically illustrates an example of a process for determining a counterfeit BLE advertiser based on random delay time in a wireless communication system supporting a Bluetooth scheme according to an embodiment of the present disclosure.

Referring to FIG. 5, it will be noted that a process for determining a counterfeit BLE advertiser based on random delay time in FIG. 5 is a process for determining a counterfeit BLE advertiser based on random delay time in a case that an advertisement interval supported in the wireless communication system is 100 ms. Further, it will be noted that a process for determining a counterfeit BLE advertiser based on random delay time in FIG. 5 is a process for determining a counterfeit BLE advertiser based on random delay time in a case that an error does not occur in a time stamp storing operation performed in each receiving device, i.e., a reference device and a normal device.

A server (not shown in FIG. 5) may calculate random delay time as expressed in Equation 1.

$$\text{Random Delay} = \text{Time Stamp}(t_n+1) - \text{Time Stamp}(t_n) - \text{Advertise Interval} \quad \text{Equation 1}$$

In Equation 1, Random Delay denotes random delay time, Time Stamp($t_n$) denotes a time stamp at time $t_n$, Time Stamp($t_n+1$) denotes a time stamp at time $t_n+1$, and Advertise Interval denotes an advertisement interval.

The server compares random delay time which is calculated based on a time stamp received from a reference device 510 and random delay time which is calculated based on a time stamp received from a normal device 520, i.e., a device which is not the reference device 510. A process for determining a counterfeit BLE advertiser based on random delay time in FIG. 5 is a process for determining a counterfeit BLE advertiser based on random delay time in a case that an error does not occur in a time stamp storing operation performed in each receiving device, so an error does not occur in a time stamp value which is stored whenever the reference device 510 and the normal device 520 receive a BLE advertisement packet. Referring to FIG. 5, it will be assumed that the reference device 510 receives BLE advertisement packets, and there is delay time 5 ms, 10 ms, 2 ms, . . . among receiving timing points of the received BLE advertisement packets and original receiving timing points. Referring to FIG. 5, it will be assumed that the normal device 520 receives BLE advertisement packets, and there is delay time 5 ms, 10 ms, 2 ms, . . . among receiving timing points of the received BLE advertisement packets and original receiving timing points.

According to the compared result, if difference between the random delay time which is calculated based on the time stamp received from the reference device 510 and the random delay time which is calculated based on the time stamp received from the normal device 520 is equal to or greater than a certain threshold time, the server determines a BLE advertiser from which the normal device 520 receives a BLE advertisement packet as a counterfeit BLE advertiser. The threshold time is determined according to a situation of the wireless communication system, may be determined by considering various parameters, and a detailed description thereof will be omitted herein.

If the difference between the random delay time which is calculated based on the time stamp received from the reference device 510 and the random delay time which is calculated based on the time stamp received from the normal device 520 is less than the certain threshold time, the server determines that the BLE advertiser from which the normal device 520 receives the BLE advertisement packet is an original BLE advertiser, not the counterfeit BLE advertiser.

Referring to FIG. 5, a server needs to synchronize a star timing point at which the reference device 510 starts detecting random delay time and a start timing point at which the normal device 520 starts detecting random delay time in order to compare random delay time. A scheme for synchronizing the start timing points is based on a pattern matching scheme, and a pattern will be described below, so a detailed description thereof will be omitted herein.

An example of a process for determining a counterfeit BLE advertiser based on random delay time in a wireless communication system supporting a Bluetooth scheme according to an embodiment of the present disclosure has been described with reference to FIG. 5, and another example of a process for determining a counterfeit BLE advertiser based on random delay time in a wireless communication system supporting a Bluetooth scheme according to an embodiment of the present disclosure will be with reference to FIG. 6.

Figure 6:
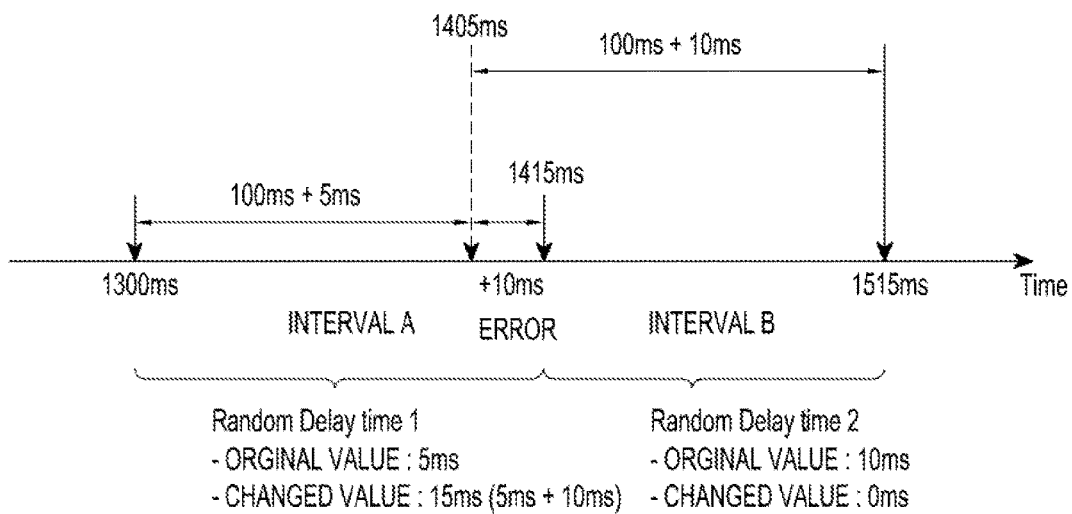
FIG. 6 schematically illustrates another example of a process for determining a counterfeit BLE advertiser based on random delay time in a wireless communication system supporting a Bluetooth scheme according to an embodiment of the present disclosure.

FIG. 6 schematically illustrates another example of a process for determining a counterfeit BLE advertiser based on random delay time in a wireless communication system supporting a Bluetooth scheme according to an embodiment of the present disclosure.

Referring to FIG. 6, it will be noted that a process for determining a counterfeit BLE advertiser based on random delay time in FIG. 6 is a process for determining a counterfeit BLE advertiser based on random delay time in a case that an advertisement interval supported in the wireless communication system is 100 ms. Further, it will be noted that a process for determining a counterfeit BLE advertiser based on random delay time in FIG. 6 is a process for determining a counterfeit BLE advertiser based on random delay time in a case that an error occurs in a time stamp storing operation performed in each receiving device, i.e., a reference device and a normal device.

Referring to FIG. 6, accuracy of a time stamp will be described below.

A time stamp indicates time at which a signal, e.g., a BLE advertisement packet is received in a receiving device. Generally, a time stamp stored at a receiving device indicates time at which a processing operation for a BLE advertisement packet is completed in a processor included in the receiving device, not time at which the BLE advertisement packet is received. So, in a case of a device which performs only a BLE sniffing operation, an error rarely occurs in storing the time stamp. So, a counterfeit BLE advertiser may be detected in the manner described before with reference to FIG. 5. For convenience, an error which occurs in storing the time stamp, i.e., an error which occurs due to difference between time at which an advertisement BLE packet is received in a receiving device and time at which a processing operation for the advertisement BLE packet is completed in a processor included in the receiving device, will be referred to as "time stamp error".

Alternatively, in a receiving device which performs a complex operation, not only a BLE sniffing operation, e.g., a smart phone, a time stamp error may frequently occur. That is, as illustrated in FIG. 6, random delay time 1 which is random delay time in an interval A is detected as 15 ms due to a time stamp error even though the random delay time 1 is actually 5 ms, and random delay time 2 which is random delay time in an interval B is detected as 0 ms due to a time stamp error even though the random delay time 2 is actually 10 ms.

So, it may be difficult that a counterfeit BLE advertiser may be detected in the manner described before with reference to FIG. 5. So, there is a need for a scheme for solving the time stamp error.

The time stamp error will be described below.

A characteristic of the time stamp error is that it is an unpredictable random error when considered in isolation. Delay time which occurs when a current time stamp is stored shortens a time interval between a time at which the next time stamp will be stored and a time at which the current time stamp is stored. So, in a case that random delay time is calculated by cumulating random delay time during a plurality of time intervals, the time stamp error may be offset by the cumulative random delay time. Accordingly, the time stamp error is unpredictable when considered in isolation.

That is, in a case that random delay time is calculated by considering only one time interval as expressed in Equation 1, accuracy of the random delay time is not guaranteed due to the above-described characteristics of the time stamp error, so it may be difficult for a server to detect a counterfeit BLE advertiser based on the random delay time. For convenience, random delay time which is calculated by considering only one time interval will be referred to as "individual random delay time".

However, as described above, in a case that the random delay time is calculated by cumulating the random delay time during the plurality of time intervals, the time stamp error may be offset by the cumulative random delay time, so the server may detect the counterfeit BLE advertiser based on the cumulative random delay time. For convenience, random delay time which is calculated by considering a plurality of time intervals will be referred to as "cumulative random delay time".

This will be summarized as expressed in Table 1.

TABLE 1

| | Reference device | Normal device |
|---|---|---|
| Individual random delay time | Interval A: 1405-1300 = 5(ms) Interval B: 1505-1405 = 10(ms) | Interval A: 1415-1300 = 15(ms) Interval B: 1515-1415 = 0(ms) |
| Cumulative random delay time | 5(interval A delay) + 10(interval B delay) = 15(ms) | 15(interval A delay) + 0(interval B delay) = 15(ms) |

As described in Table 1, it will be understood that there may be an error in determining a counterfeit BLE advertiser in a server based on individual random delay time for each of a reference device and a normal device, but there is no error in determining the counterfeit BLE advertiser in the server based on cumulative random delay time for each of the reference device and the normal device.

Another example of a process for determining a counterfeit BLE advertiser based on random delay time in a wireless communication system supporting a Bluetooth scheme according to an embodiment of the present disclosure has been described with reference to FIG. 6, and still another example of a process for determining a counterfeit BLE advertiser based on random delay time in a wireless communication system supporting a Bluetooth scheme according to an embodiment of the present disclosure will be with reference to FIG. 7.

Figure 7:
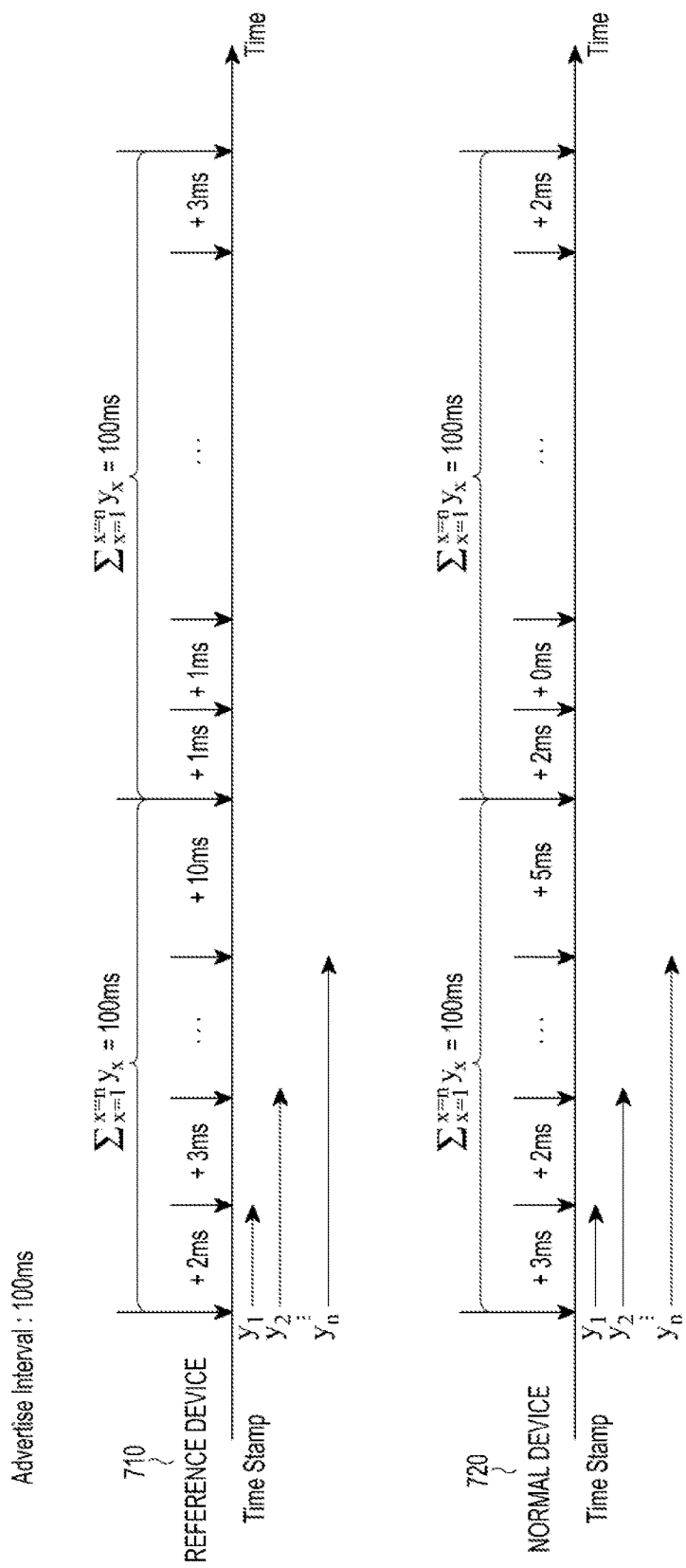
FIG. 7 schematically illustrates still another example of a process for determining a counterfeit BLE advertiser based on random delay time in a wireless communication system supporting a Bluetooth scheme according to an embodiment of the present disclosure.

FIG. 7 schematically illustrates still another example of a process for determining a counterfeit BLE advertiser based on random delay time in a wireless communication system supporting a Bluetooth scheme according to an embodiment of the present disclosure.

Referring to FIG. 7, it will be noted that a process for determining a counterfeit BLE advertiser based on random delay time in FIG. 7 is a process for determining a counterfeit BLE advertiser based on random delay time, e.g., cumulative random delay time, in a case that an advertisement interval supported in the wireless communication system is 100 ms. Further, it will be noted that a process for determining a counterfeit BLE advertiser based on random delay time in FIG. 7 is a process for determining a counterfeit BLE advertiser based on random delay time in a case that a time stamp error occurs in each receiving device, i.e., a reference device and a normal device.

Referring to FIG. 7, a server (not shown in FIG. 7) may calculate cumulative random delay time as expressed in Equation 2.

Cumulative Random Delay=(Time Stamp($t_x$)−Time Stamp($t_n$))% Advertise Interval   Equation 2

In Equation 2, Cumulative Random Delay denotes cumulative random delay time, and $t_x$ denotes a minimum value among time which is greater than time $t_n$ as time at which cumulative random delay time is 0 (Cumulative Random Delay=0).

The server detects a counterfeit BLE advertiser by comparing a length of a cumulative interval of a reference device 710 and a length of a cumulative interval of a normal device 720, not by comparing cumulative random delay time of the reference device 710 and cumulative random delay time of the normal device 720. Here, a cumulative interval denotes time which is consumed until a length of cumulative random delay time is equal to a certain time, e.g., a length of an advertisement interval. The cumulative interval will be described below, so a detailed description thereof will be omitted herein.

Referring to FIG. 7, it will be assumed that the reference device 710 receives BLE advertisement packets, there is delay time 2 ms, 3 ms, . . . , 10 ms among receiving timing points of the received BLE advertisement packets and original receiving timing points in a cumulative interval 1, and there is delay time 1 ms, 1 ms, . . . , 3 ms among receiving timing points of the received BLE advertisement packets and original receiving timing points in a cumulative interval 2. Referring to FIG. 7, it will be assumed that the normal device 720 receives BLE advertisement packets, there is delay time 3 ms, 2 ms, . . . , 5 ms among receiving timing points of the received BLE advertisement packets and original receiving timing points in a cumulative interval 1, and there is delay time 2 ms, 0 ms, . . . , 2 ms among receiving timing points of the received BLE advertisement packets and original receiving timing points in a cumulative interval 2.

According to the compared result, if difference between a cumulative interval of the reference device 710 and a cumulative interval of the normal device 720 is equal to or greater than a certain threshold time, the server determines a BLE advertiser from which the normal device 720 receives a BLE advertisement packet as a counterfeit BLE advertiser. The threshold time is determined according to a situation of the wireless communication system, may be determined by considering various parameters, and a detailed description thereof will be omitted herein.

If the difference between the cumulative interval of the reference device 710 and the cumulative interval of the normal device 720 is less than the certain threshold time, the server determines that the BLE advertiser from which the normal device 720 receives the BLE advertisement packet is an original BLE advertiser, not the counterfeit BLE advertiser.

Referring to FIG. 7, $y_x$ denotes cumulative random delay time at time t, and x denotes time at which a receiving device receives a BLE advertisement packet.

Referring to FIG. 7, a server needs to synchronize a start timing point at which the reference device 710 starts detecting cumulative random delay time and a start timing point at which the normal device 720 starts detecting cumulative random delay time in order to compare a cumulative interval. A scheme for synchronizing the start timing points is based on a pattern matching scheme, and a pattern will be described below, so a detailed description thereof will be omitted herein.

Still another example of a process for determining a counterfeit BLE advertiser based on random delay time in a wireless communication system supporting a Bluetooth scheme according to an embodiment of the present disclosure has been described with reference to FIG. 7, and an example of a characteristic of a cumulative interval in a wireless communication system supporting a Bluetooth scheme according to an embodiment of the present disclosure will be described with reference to FIG. 8.

Figure 8:
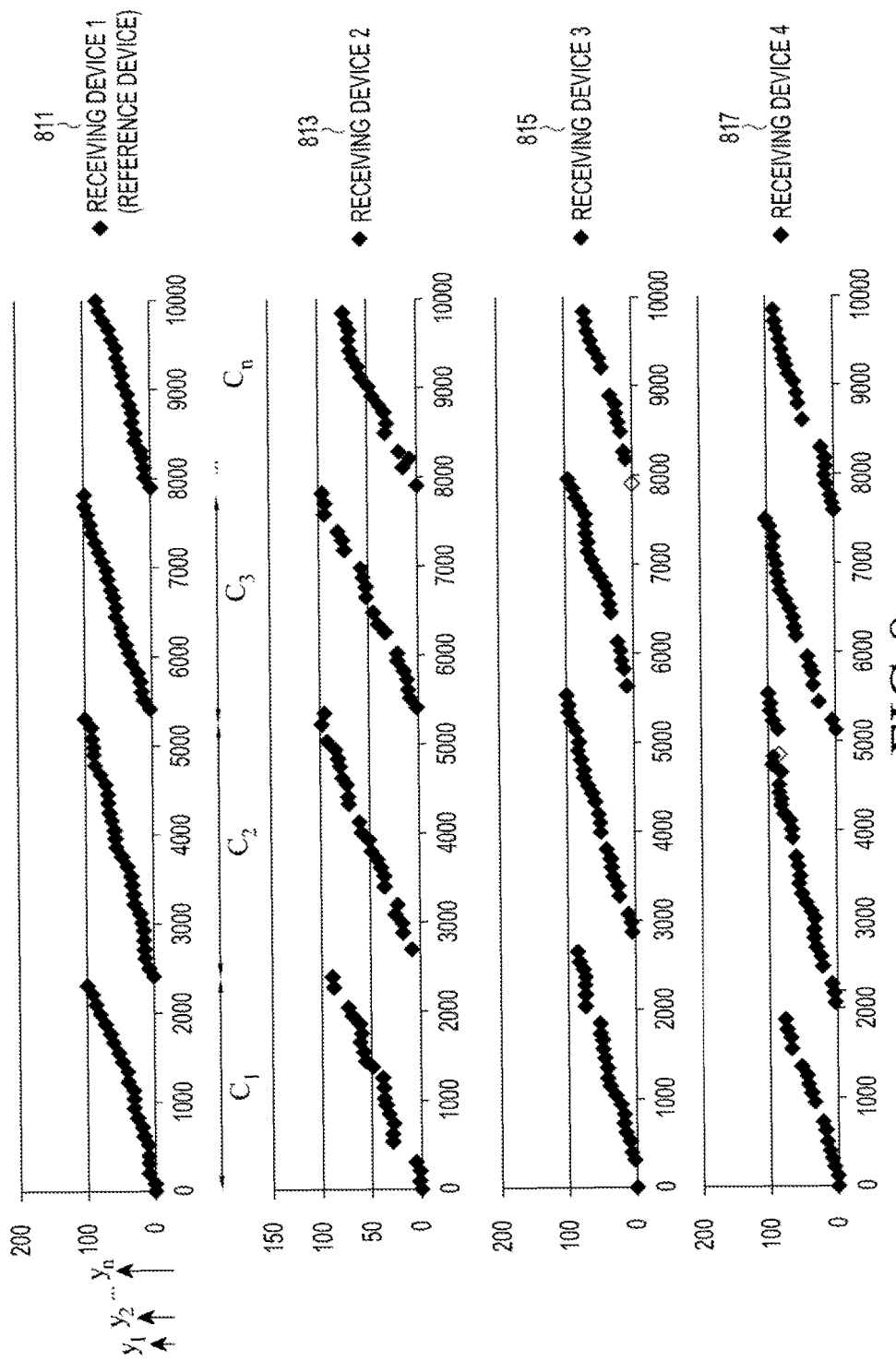
FIG. 8 schematically illustrates an example of a characteristic of a cumulative interval in a wireless communication system supporting a Bluetooth scheme according to an embodiment of the present disclosure.

FIG. 8 schematically illustrates an example of a characteristic of a cumulative interval in a wireless communication system supporting a Bluetooth scheme according to an embodiment of the present disclosure.

Referring to FIG. 8, if there is a time stamp error, a server (not shown in FIG. 8) may detect a counterfeit BLE advertiser based on cumulative random delay time. So, in the wireless communication system, a cumulative interval as time which is consumed until the cumulative random delay time is equal to a certain time, e.g., an advertisement interval, e.g., 100 ms is detected.

In a case that the cumulative interval is equal to the advertisement interval, if a modulo operation is performed based on difference among time stamps and a length of the advertisement interval, a receiving device may calculate the cumulative random delay time regardless of impact due to BLE advertisement packet loss.

It may be an important factor in total performance of the wireless communication system that a time scale of the cumulative interval is greater than an error time scale of a time stamp and the impact due to the BLE advertisement packet loss may be ignored when the cumulative random delay time is calculated.

A characteristic of each of a receiving device 1 811, a receiving device 2 813, a receiving device 3 815, and a receiving device 4 817 is illustrated in FIG. 8. Here, the receiving device 1 811 is a reference device.

Referring to FIG. 8, $y_x$ denotes cumulative random delay time at time t, and x denotes time at which a receiving device receives a BLE advertisement packet. Further, $C_n$ denotes time which is consumed until sum of cumulative random delays is equal to a length of an advertisement interval, i.e., 100 ms, i.e., a cumulative interval.

An example of a characteristic of a cumulative interval in a wireless communication system supporting a Bluetooth scheme according to an embodiment of the present disclosure has been described with reference to FIG. 8, and another example of a characteristic of a cumulative interval in a wireless communication system supporting a Bluetooth scheme according to an embodiment of the present disclosure will be described with reference to FIG. 9.

Figure 9:
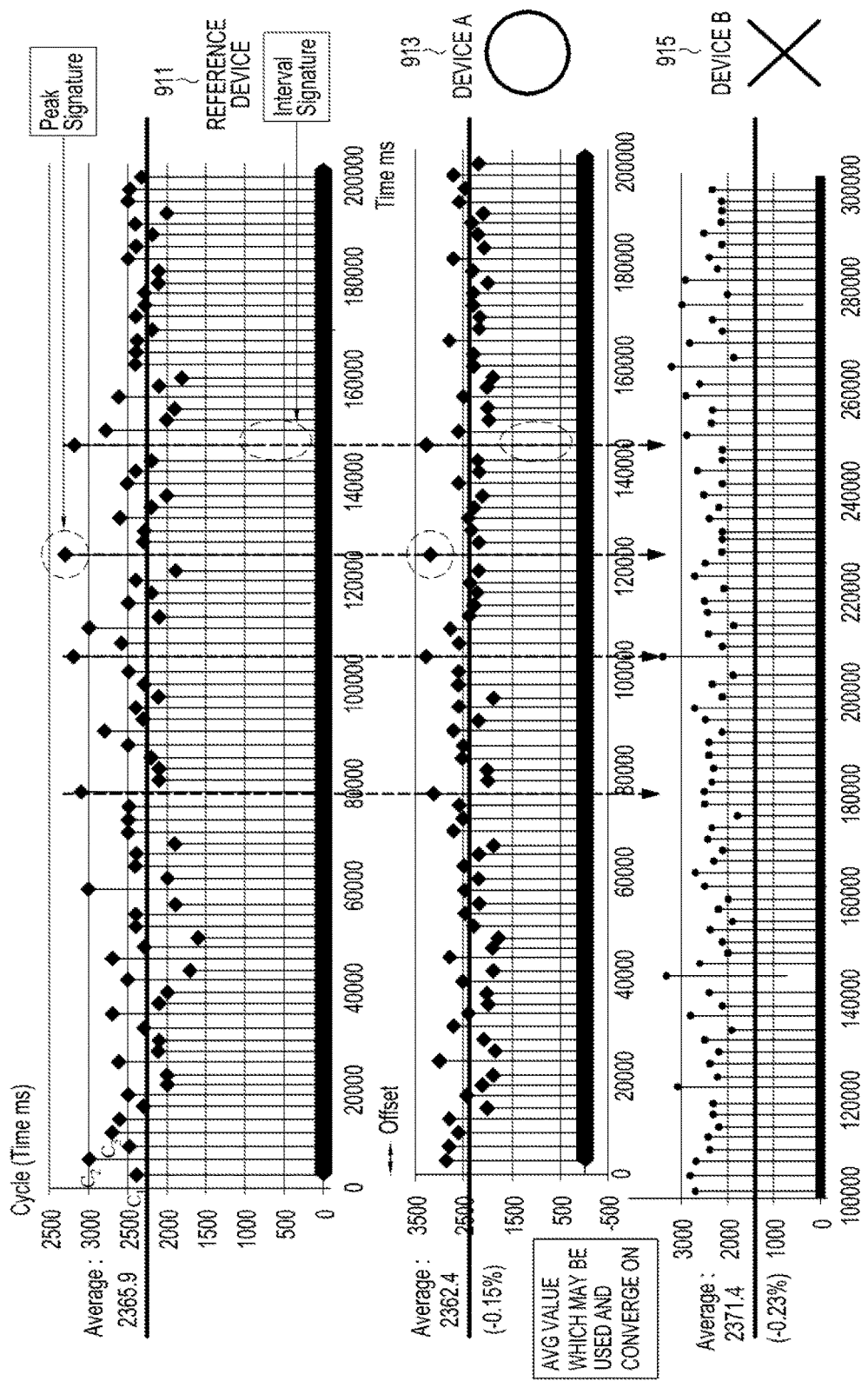
FIG. 9 schematically illustrates another example of a characteristic of a cumulative interval in a wireless communication system supporting a Bluetooth scheme according to an embodiment of the present disclosure.

FIG. 9 schematically illustrates another example of a characteristic of a cumulative interval in a wireless communication system supporting a Bluetooth scheme according to an embodiment of the present disclosure.

Referring to FIG. 9, it will be noted that a characteristic of a cumulative interval in FIG. 9 is a result of cumulative interval calculation expressed as a graph.

A result close to an average cumulative interval frequently occurs stochastically, so it is difficult to use the result for a comparing operation of detecting a counterfeit BLE advertiser. However, a peak signature as a value which is equal to or greater than an average value by a certain threshold value among calculated results rarely occurs stochastically. Referring to FIG. 9, it will be noted that the threshold value is illustrated as "Average", and may be differently set in each receiving device. Referring to FIG. 9, a vertical axis indicates a length of a cumulative interval, and a horizontal axis indicates time.

So, a server may use the peak signature for detecting the counterfeit BLE advertiser.

Referring to FIG. 9, it may be determined that a receiving device A 913 as a device in which a peak signature occurs at time which a peak signature occurs in a reference device 911 receives BLE advertisement packets from an original BLE advertiser.

Alternatively, it may be determined that a receiving device B 913 as a device in which a peak signature does not occur at time which the peak signature occurs in the reference device 911 does not receive BLE advertisement packets from the original BLE advertiser. That is, a server may determine that the receiving device B 913 receives BLE advertisement packets from a counterfeit BLE advertiser.

Another example of a characteristic of a cumulative interval in a wireless communication system supporting a Bluetooth scheme according to an embodiment of the present disclosure has been described with reference to FIG. 9, and a process for detecting a pattern according to random delay time in a wireless communication system supporting a Bluetooth scheme according to an embodiment of the present disclosure will be described with reference to FIG. 10.

Figure 10:
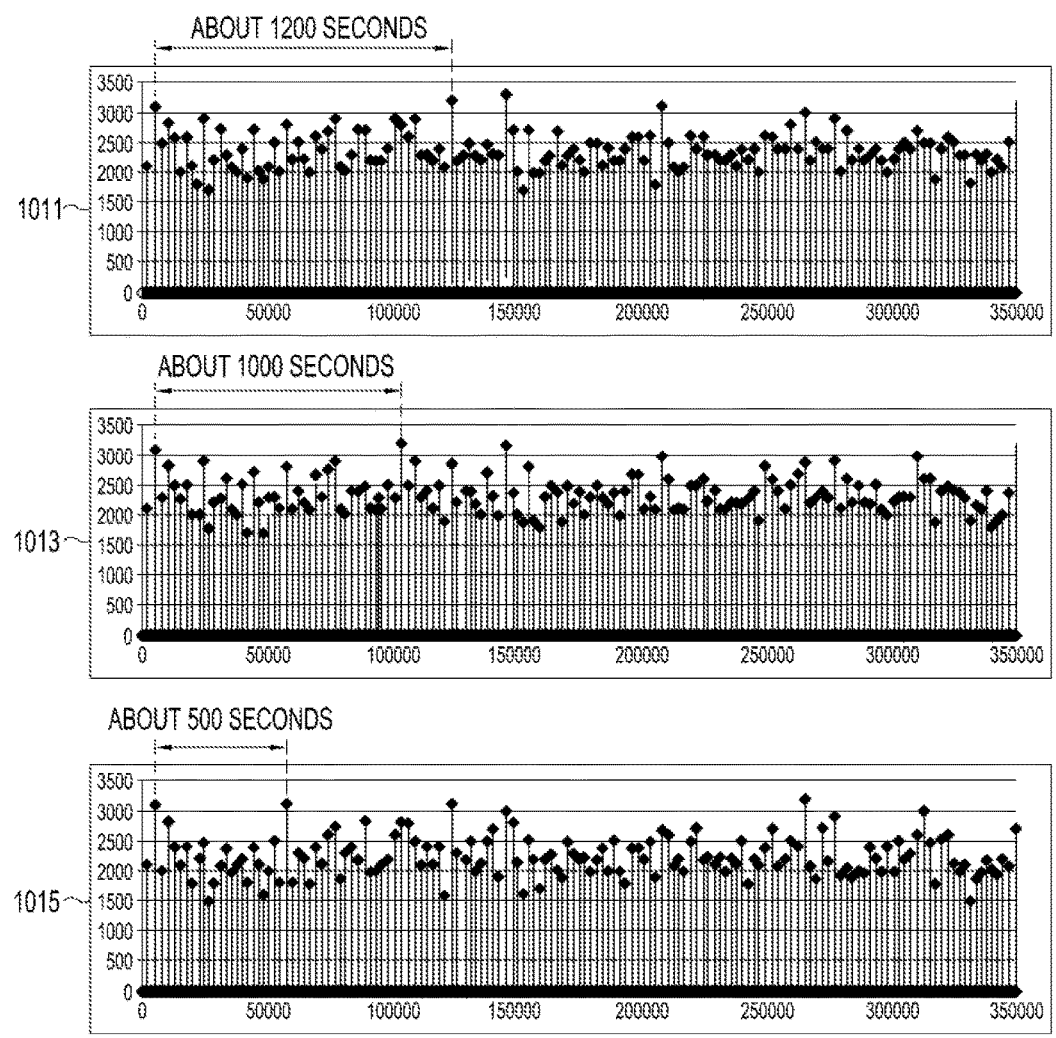
FIG. 10 schematically illustrates a process for detecting a pattern according to random delay time in a wireless communication system supporting a Bluetooth scheme according to an embodiment of the present disclosure.

FIG. 10 schematically illustrates a process for detecting a pattern according to random delay time in a wireless communication system supporting a Bluetooth scheme according to an embodiment of the present disclosure.

Referring to FIG. 10, the random delay time may be tolerated up to 0~10 ms. Referring to FIG. 10, a vertical axis indicates a length of a cumulative interval, and a horizontal axis indicates time.

If the random delay time tolerated in the wireless communication system is used, time required for detecting the first pattern is about 1200 s (1011). Here, a pattern denotes a pattern for a cumulative interval, a counterfeit BLE advertiser may be detected based on the pattern, so time required for detecting the counterfeit BLE advertiser may be changed according to time required for detecting the pattern.

As described above, if the random delay time tolerated in the wireless communication system is used, the time required for detecting the first pattern may be long, so an embodiment of the present proposes a scheme for changing tolerated random delay time for shortening time required for detecting the first pattern.

For example, an embodiment of the present disclosure changes the tolerated random delay time supported in the wireless communication system from 0~10 ms which is currently used random delay time to 0~20 ms. That is, maximum tolerated random delay time is increased from 10 ms to 20 ms. In this case, time required for detecting the first pattern is about 1000 s (1013).

So, a server may detect the first pattern within time which is shorter than time required for detecting the first pattern according to random delay time tolerated in the wireless communication system which is currently used 0~10 ms, and time required for the server to detect a counterfeit BLE advertiser may be decreased.

For another example, an embodiment of the present disclosure changes the tolerated random delay time supported in the wireless communication system from 0~10 ms which is currently used random delay time to 0~50 ms. That is, maximum tolerated random delay time is increased from 10 ms to 50 ms. In this case, time required for detecting the first pattern is about 500 s (1015).

So, a server may detect the first pattern within time which is shorter than time required for detecting the first pattern according to random delay time tolerated in the wireless communication system which is currently used 0~10 ms, and time required for the server to detect a counterfeit BLE advertiser may be decreased.

Meanwhile, a BLE payload, i.e., a BLE advertisement packet, may be encrypted based on time required for detecting the first pattern. This will be described below.

If a BLE advertiser and a server know the time required for detecting the first pattern, the pattern, a period of the pattern, and the like, the BLE advertiser may perform an encryption operation for a BLE advertisement packet based on the time required for detecting the first pattern, the pattern, the period of the pattern, and the like.

For example, as illustrated in 1013 in FIG. 10, if tolerated random delay time is 0~10 ms, time required for detecting the first pattern is 1200 seconds, a BLE advertiser may perform an encryption operation for a BLE advertisement packet using a number 1200. A server knows that the time required for detecting the first pattern is 1200 seconds, so the server may decode the BLE advertisement packet which is encrypted using the number 1200. However, if an attacker, i.e., a counterfeit BLE advertiser, captures a BLE advertisement packet on air, the server may not decode the captured BLE advertisement packet.

As described above, if the BLE payload, i.e., the BLE advertisement packet, is encrypted based on the time required for detecting the first pattern, total security of the wireless communication system may be enhanced.

A process for detecting a pattern according to random delay time in a wireless communication system supporting a Bluetooth scheme according to an embodiment of the present disclosure has been described with reference to FIG. 10, and still another example of a process for detecting a counterfeit BLE advertiser in a wireless communication system supporting a Bluetooth scheme according to an embodiment of the present disclosure will be described with reference to FIG. 11.

Figure 11:
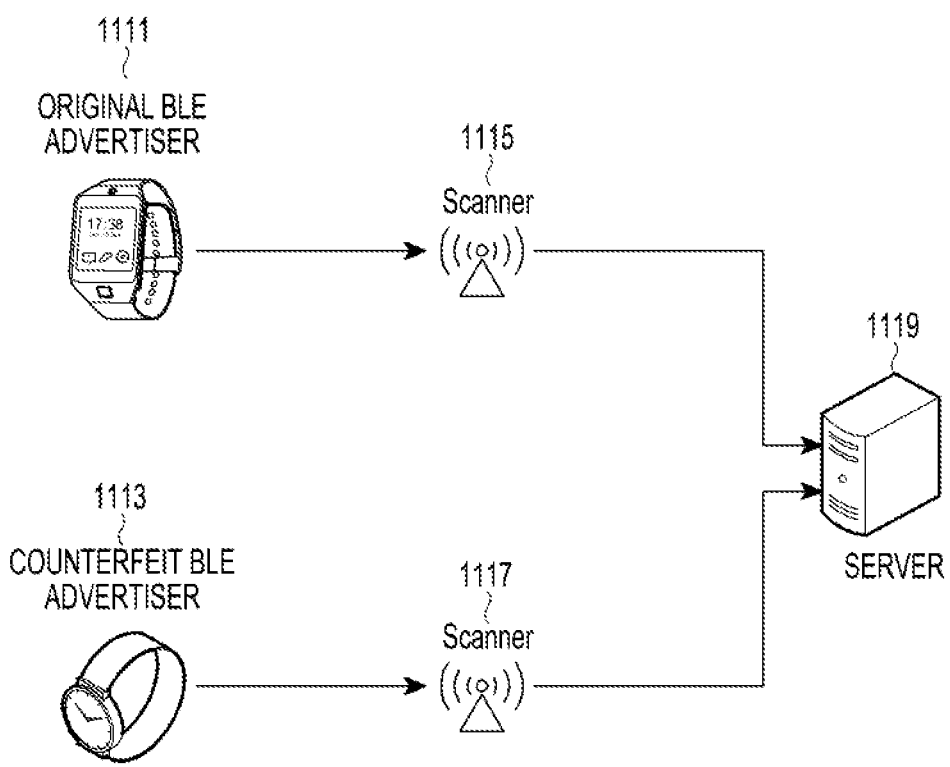
FIG. 11 schematically illustrates still another example of a process for detecting a counterfeit BLE advertiser in a wireless communication system supporting a Bluetooth scheme according to an embodiment of the present disclosure.

FIG. 11 schematically illustrates still another example of a process for detecting a counterfeit BLE advertiser in a wireless communication system supporting a Bluetooth scheme according to an embodiment of the present disclosure.

Referring to FIG. 11, it will be noted that a process for detecting a counterfeit BLE advertiser in FIG. 11 is a process for detecting a counterfeit BLE advertiser which is performed by considering a device which may transmit a BLE advertisement packet such as a wearable device and a tag.

The wireless communication system includes a plurality of BLE advertisers, e.g., an original BLE advertiser 1111 and a counterfeit BLE advertiser 1113, a plurality of scanners, e.g., a scanner 1115 and a scanner 1117, and a server 1119.

The original BLE advertiser 1111 and the server 1119 install a specific application, and may use the same random delay time at the same time if the same application is installed in the original BLE advertiser 1111 and the server 1119.

The counterfeit BLE advertiser 1113 is an attacker, and denotes a BLE advertiser which broadcasts a counterfeit BLE advertisement packet.

The original BLE advertiser 1111 broadcasts a BLE advertisement packet. The original BLE advertiser 1111 broadcasts the BLE advertisement packet in order to inform presence of the original BLE advertiser 1111.

The counterfeit BLE advertiser 1113 broadcasts a BLE advertisement packet. The counterfeit BLE advertiser 1113 broadcasts the BLE advertisement packet in order to hide presence of the counterfeit BLE advertiser 1113.

The scanner 1115 receives the BLE advertisement packet broadcasted by the original BLE advertiser 1111, and stores a time stamp for the BLE advertisement packet. The time stamp has been described above, so a detailed description thereof will be omitted herein. The scanner 1115 transmits the received BLE advertisement packet and the time stamp to the server 1119.

After receiving the BLE advertisement packet and the time stamp from the scanner 1115, the server 1119 stores the received time stamp and calculates random delay time or cumulative random delay time based on the time stamp. An operation for calculating the random delay time or the cumulative random delay time based on the time stamp in the server 1119 has been described above, so a detailed description thereof will be omitted herein. That is, the server 1119 calculates the random delay time for detecting a counterfeit BLE advertiser based on the random delay time if there is no time stamp error in the wireless communication system, or calculates the cumulative random delay time for detecting a counterfeit BLE advertiser based on the cumulative random delay time if there is a time stamp error in the wireless communication system, as has been described above, and a detailed description for this will be omitted herein.

The counterfeit BLE advertiser 1113 receives the BLE advertisement packet broadcasted by the original BLE advertiser 1111, and broadcasts the received BLE advertisement packet. The scanner 1117 receives the BLE advertisement packet broadcasted by the counterfeit BLE advertiser 1113, and stores a time stamp for the BLE advertisement packet. The scanner 1117 transmits the received BLE advertisement packet and the time stamp to the server 1119.

After receiving the BLE advertisement packet and the time stamp from the scanner 1117, the server 1119 calculates random delay time or cumulative random delay time based on the received time stamp.

An operation in a case that the server 1119 detects a counterfeit BLE advertiser based on random delay time will be described below.

The server 1119 compares the random delay time which is calculated based on the time stamp received from the scanner 1117 and the random delay time which is calculated based on the time stamp received from the scanner 1115 with random delay time which is internally calculated by the server 1119.

The server 1119 determines whether each of the original BLE advertiser 1111 and the counterfeit BLE advertiser 1113 is a counterfeit BLE advertiser based on the compared result.

A scheme for determining whether each of the original BLE advertiser 1111 and the counterfeit BLE advertiser 1113 is a counterfeit BLE advertiser based on the compared result has been described above, so a detailed description thereof will be omitted herein.

If the counterfeit BLE advertiser 1113 is determined as the counterfeit BLE advertiser, the server 1119 transmits a counterfeit alert packet to the scanner 1117.

An operation in a case that the server 1119 detects a counterfeit BLE advertiser based on a cumulative random delay time will be described below.

The server 1119 compares the cumulative random delay time which is calculated based on the time stamp received from the scanner 1117 and the cumulative random delay time which is calculated based on the time stamp received from the scanner 1115 with cumulative random delay time which is internally calculated by the server 1119.

The server 1119 determines whether each of the original BLE advertiser 1111 and the counterfeit BLE advertiser 1113 is a counterfeit BLE advertiser based on the compared result.

A scheme for determining whether each of the original BLE advertiser 1111 and the counterfeit BLE advertiser 1113 is the counterfeit BLE advertiser based on the compared result has been described above, so a detailed description thereof will be omitted herein.

If the counterfeit BLE advertiser 1113 is determined as the counterfeit BLE advertiser, the server 1119 transmits a counterfeit alert packet to the scanner 1117.

Still another example of a process for detecting a counterfeit BLE advertiser in a wireless communication system supporting a Bluetooth scheme according to an embodiment of the present disclosure has been described with reference to FIG. 11, and still another example of a process for detecting a counterfeit BLE advertiser in a wireless communication system supporting a Bluetooth scheme according to an embodiment of the present disclosure will be described with reference to FIG. 12.

Figure 12:
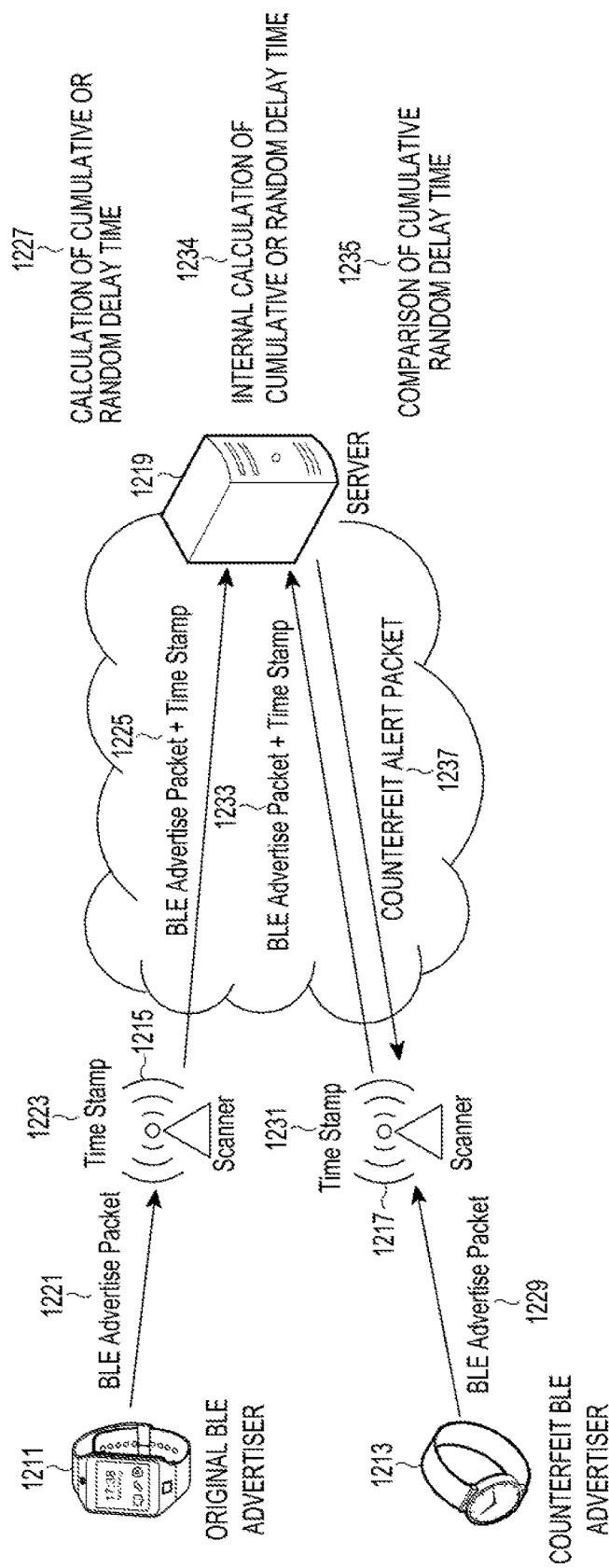
FIG. 12 schematically illustrates still another example of a process for detecting a counterfeit BLE advertiser in a wireless communication system supporting a Bluetooth scheme according to an embodiment of the present disclosure.

FIG. 12 schematically illustrates still another example of a process for detecting a counterfeit BLE advertiser in a wireless communication system supporting a Bluetooth scheme according to an embodiment of the present disclosure.

Referring to FIG. 12, it will be noted that a process for detecting a counterfeit BLE advertiser in FIG. 12 is a process for detecting a counterfeit BLE advertiser which is performed by considering a device which may transmit a BLE advertisement packet such as a wearable device and a tag.

The wireless communication system includes a plurality of BLE advertisers, e.g., an original BLE advertiser 1211 and a counterfeit BLE advertiser 1213, a plurality of scanners, e.g., a reference scanner 1215 and a counterfeit scanner 1217, and a server 1219.

The original BLE advertiser 1211 broadcasts a BLE advertisement packet at operation 1221. The reference scanner 1215 receives the BLE advertisement packet broadcasted by the original BLE advertiser 1211, and stores a time stamp for the BLE advertisement packet at operation 1223. The reference scanner 1215 transmits the received BLE advertisement packet and the time stamp for the BLE advertisement packet to the server 1219 at operation 1225.

After receiving the BLE advertisement packet and the time stamp from the reference scanner 1215, the server 1219 stores the time stamp received from the reference scanner 1215, and calculates random delay time or cumulative random delay time based on the time stamp at operation 1227. An operation for calculating the random delay time or the cumulative random delay time based on the time stamp in the server 1219 has been described above, so a detailed description thereof will be omitted herein. That is, the server 1219 calculates the random delay time for detecting a counterfeit BLE advertiser based on the random delay time if there is no time stamp error in the wireless communication system, or calculates the cumulative random delay time for detecting a counterfeit BLE advertiser based on the cumulative random delay time if there is a time stamp error in the wireless communication system, as has been described above, and a detailed description for this will be omitted herein.

The counterfeit BLE advertiser 1213 broadcasts a counterfeit BLE advertisement packet at operation 1229. The counterfeit scanner 1217 receives the BLE advertisement packet broadcasted by the counterfeit BLE advertiser 1213 and stores a time stamp for the received BLE advertisement packet at operation 1231. The counterfeit scanner 1217 transmits the received BLE advertisement packet and the time stamp for the received BLE advertisement packet to the server 1219 at operation 1233.

After receiving the BLE advertisement packet and the time stamp from the counterfeit scanner 1217, the server 1219 stores the time stamp received from the counterfeit scanner 1217 and calculates random delay time or cumulative random delay time based on the time stamp at operation 1234.

Operation 1235 in a case that the server 1219 detects a counterfeit BLE advertiser based on random delay time in the server 1219 will be described below.

At operation 1235, the server 1219 compares the random delay time which is calculated based on the time stamp received from the scanner 1217 and the random delay time which is calculated based on the time stamp received from the scanner 1215 with random delay time which is internally calculated by the server 1219.

The server 1219 determines whether each of the original BLE advertiser 1211 and the counterfeit BLE advertiser 1213 is a counterfeit BLE advertiser based on the compared result.

A scheme for determining whether each of the original BLE advertiser 1211 and the counterfeit BLE advertiser 1213 is the counterfeit BLE advertiser based on the compared result has been described above, and a detailed description thereof will be omitted herein.

If the counterfeit BLE advertiser 1213 is determined as the counterfeit BLE advertiser, the server 1219 transmits a counterfeit alert packet to the scanner 1217 at operation 1237.

Operation 1235 in a case that the server 1219 detects a counterfeit BLE advertiser based on a cumulative random delay time will be described below.

At operation 1235, the server 1219 compares cumulative random delay time which is calculated based on a time stamp received from the scanner 1217 and cumulative random delay time which is calculated based on a time stamp received from the scanner 1215 with cumulative random delay time which is internally calculated by the server 1219.

The server 1219 determines whether each of the original BLE advertiser 1211 and the counterfeit BLE advertiser 1213 is a counterfeit BLE advertiser based on the compared result.

A scheme for determining whether each of the original BLE advertiser 1211 and the counterfeit BLE advertiser 1213 is the counterfeit BLE advertiser based on the compared result has been described above, so a detailed description thereof will be omitted herein.

If the counterfeit BLE advertiser 1213 is determined as the counterfeit BLE advertiser, the server 1219 transmits a counterfeit alert packet to the scanner 1217 at operation 1237.

Still another example of a process for detecting a counterfeit BLE advertiser in a wireless communication system supporting a Bluetooth scheme according to an embodiment of the present disclosure has been described with reference to FIG. 12, and an example of a case that a process for detecting a counterfeit BLE advertiser is used in a wireless communication system supporting a Bluetooth scheme according to an embodiment of the present disclosure will be described with reference to FIG. 13.

Figure 13:
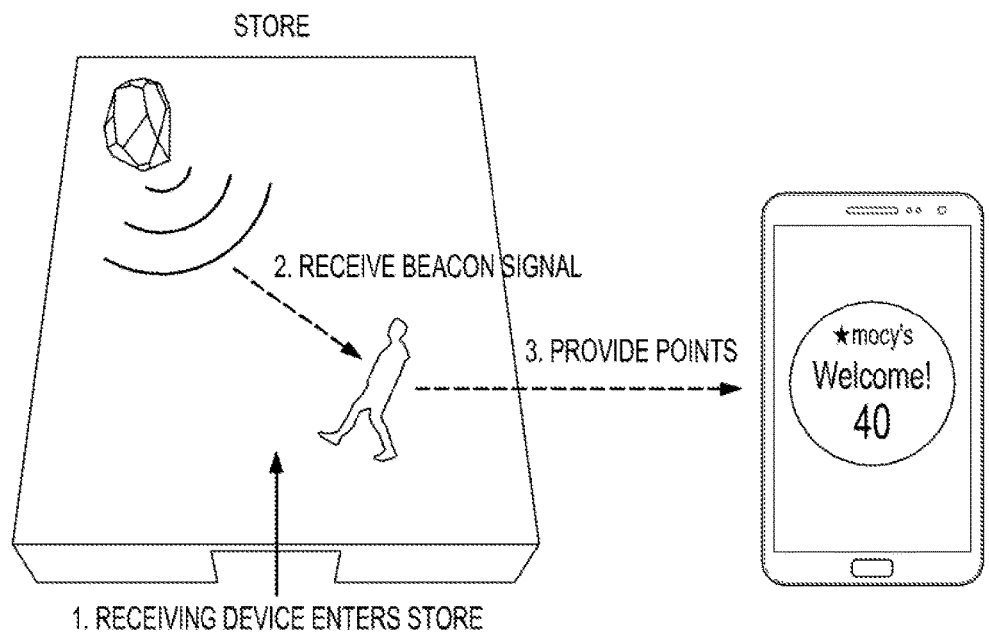
FIG. 13 schematically illustrates an example of a case that a process for detecting a counterfeit BLE advertiser is used in a wireless communication system supporting a Bluetooth scheme according to an embodiment of the present disclosure.

FIG. 13 schematically illustrates an example of a case that a process for detecting a counterfeit BLE advertiser is used in a wireless communication system supporting a Bluetooth scheme according to an embodiment of the present disclosure.

Referring to FIG. 13, when a user with a receiving device enters a store, the receiving device may be automatically checked in at a BLE advertiser which is managed in the store. In this case, the receiving device receives a BLE advertisement packet broadcasted by the BLE advertiser, e.g., a beacon signal, so the receiving device may perform an operation corresponding to the received BLE advertisement packet. Referring to FIG. 13, it will be assumed that points usable in the store are automatically provided to the receiving device when the receiving device receives the beacon signal.

If the BLE advertiser is the counterfeit BLE advertiser, a case that points are provided to the receiving device even though the store does not provide the points to the receiving device may occur. So, a server which is managed at the store may prevent this case by detecting a counterfeit BLE advertiser based on a scheme for detecting a counterfeit BLE advertiser according to an embodiment of the present disclosure.

An example of a case that a process for detecting a counterfeit BLE advertiser is used in a wireless communication system supporting a Bluetooth scheme according to an embodiment of the present disclosure has been described with reference to FIG. 13, and another example of a case that a process for detecting a counterfeit BLE advertiser is used in a wireless communication system supporting a Bluetooth scheme according to an embodiment of the present disclosure will be described with reference to FIG. 14.

Figure 14:
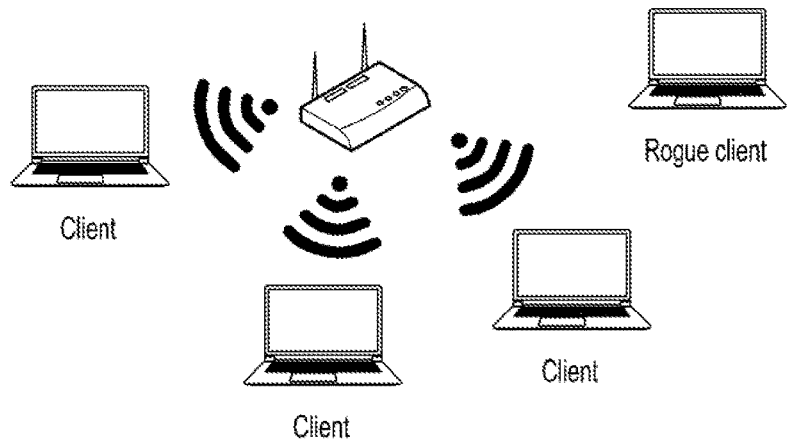
FIG. 14 schematically illustrates another example of a case that a process for detecting a counterfeit BLE advertiser is used in a wireless communication system supporting a Bluetooth scheme according to an embodiment of the present disclosure.

FIG. 14 schematically illustrates another example of a case that a process for detecting a counterfeit BLE advertiser is used in a wireless communication system supporting a Bluetooth scheme according to an embodiment of the present disclosure.

Referring to FIG. 14, in a case that the wireless communication system uses a Wi-Fi scheme, it may be an important factor for enhancing total system performance that a rogue client is detected.

So, in an environment that the Wi-Fi scheme is used, an access point (AP) may detect clients which access the AP based on a BLE advertisement packet received from a counterfeit BLE advertiser, i.e., a counterfeit MAC address among clients which access the AP. So, clients which use a counterfeit MAC address may not access the AP, and total performance of the wireless communication system may be enhanced.

Another example of a case that a process for detecting a counterfeit BLE advertiser is used in a wireless communication system supporting a Bluetooth scheme according to an embodiment of the present disclosure has been described with reference to FIG. 14, and still another example of a case that a process for detecting a counterfeit BLE advertiser is used in a wireless communication system supporting a Bluetooth scheme according to an embodiment of the present disclosure will be described with reference to FIG. 15.

Figure 15:
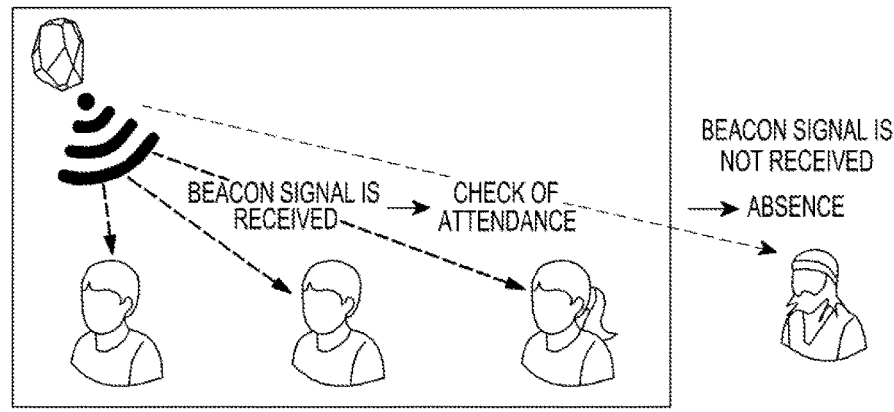
FIG. 15 schematically illustrates still another example of a case that a process for detecting a counterfeit BLE advertiser is used in a wireless communication system supporting a Bluetooth scheme according to an embodiment of the present disclosure.

FIG. 15 schematically illustrates still another example of a case that a process for detecting a counterfeit BLE advertiser is used in a wireless communication system supporting a Bluetooth scheme according to an embodiment of the present disclosure.

Referring to FIG. 15, recently, in a university, students' user terminals are registered at a lecture room in advance, and attendance at a lecture is automatically checked when it is determined that the user terminals enter at the lecture room at lecture time. That is, it is determined that the students attend the lecture when the user terminals receive a BLE advertisement packet transmitted by a BLE advertiser which is deployed at the lecture room.

If the BLE advertiser is a counterfeit BLE advertiser, a situation that it is determined that a specific student attends the lecture occurs even though the specific student does not attend the lecture. So, a server managed at the lecture room may prevent this situation by detecting a counterfeit BLE advertiser based on a scheme for detecting a counterfeit BLE advertiser according to an embodiment of the present disclosure.

Still another example of a case that a process for detecting a counterfeit BLE advertiser is used in a wireless communication system supporting a Bluetooth scheme according to an embodiment of the present disclosure has been described with reference to FIG. 15, and still another example of a case that a process for detecting a counterfeit BLE advertiser is used in a wireless communication system supporting a Bluetooth scheme according to an embodiment of the present disclosure will be described with reference to FIG. 16.

Figure 16:
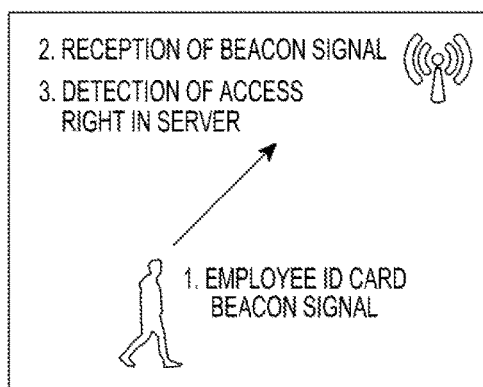
FIG. 16 schematically illustrates still another example of a case that a process for detecting a counterfeit BLE advertiser is used in a wireless communication system supporting a Bluetooth scheme according to an embodiment of the present disclosure.
Figure 16:
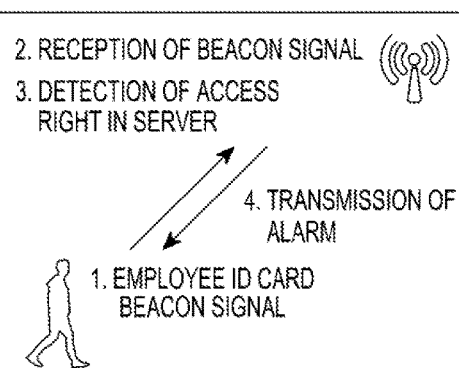

FIG. 16 schematically illustrates still another example of a case that a process for detecting a counterfeit BLE advertiser is used in a wireless communication system supporting a Bluetooth scheme according to an embodiment of the present disclosure.

Referring to FIG. 16, an access right level is differently set per area within a company, and an alarm message may be transmitted if a user device which is not appropriated for an access right level of a specific area accesses the specific area. That is, a server which is deployed at each area receives a beacon signal broadcasted by a user device, e.g., a user device included in an employee ID card to determine whether to transmit an alarm message to the user device based on the received beacon signal. Here, the user device is a BLE advertiser.

If the BLE advertiser is a counterfeit BLE advertiser, a situation that an access to a specific area which is not appropriated for an access right level of an employee is permitted occurs even though the employee accesses the specific area. So, a server which is managed at each area may prevent this situation by detecting a counterfeit BLE advertiser based on a scheme for detecting a counterfeit BLE advertiser according to an embodiment of the present disclosure.

Still another example of a case that a process for detecting a counterfeit BLE advertiser is used in a wireless communication system supporting a Bluetooth scheme according to an embodiment of the present disclosure has been described with reference to FIG. 16, and an authenticating procedure between a reference device and a server in a wireless communication system supporting a Bluetooth scheme according to an embodiment of the present disclosure will be described with reference to FIG. 17.

Figure 17:
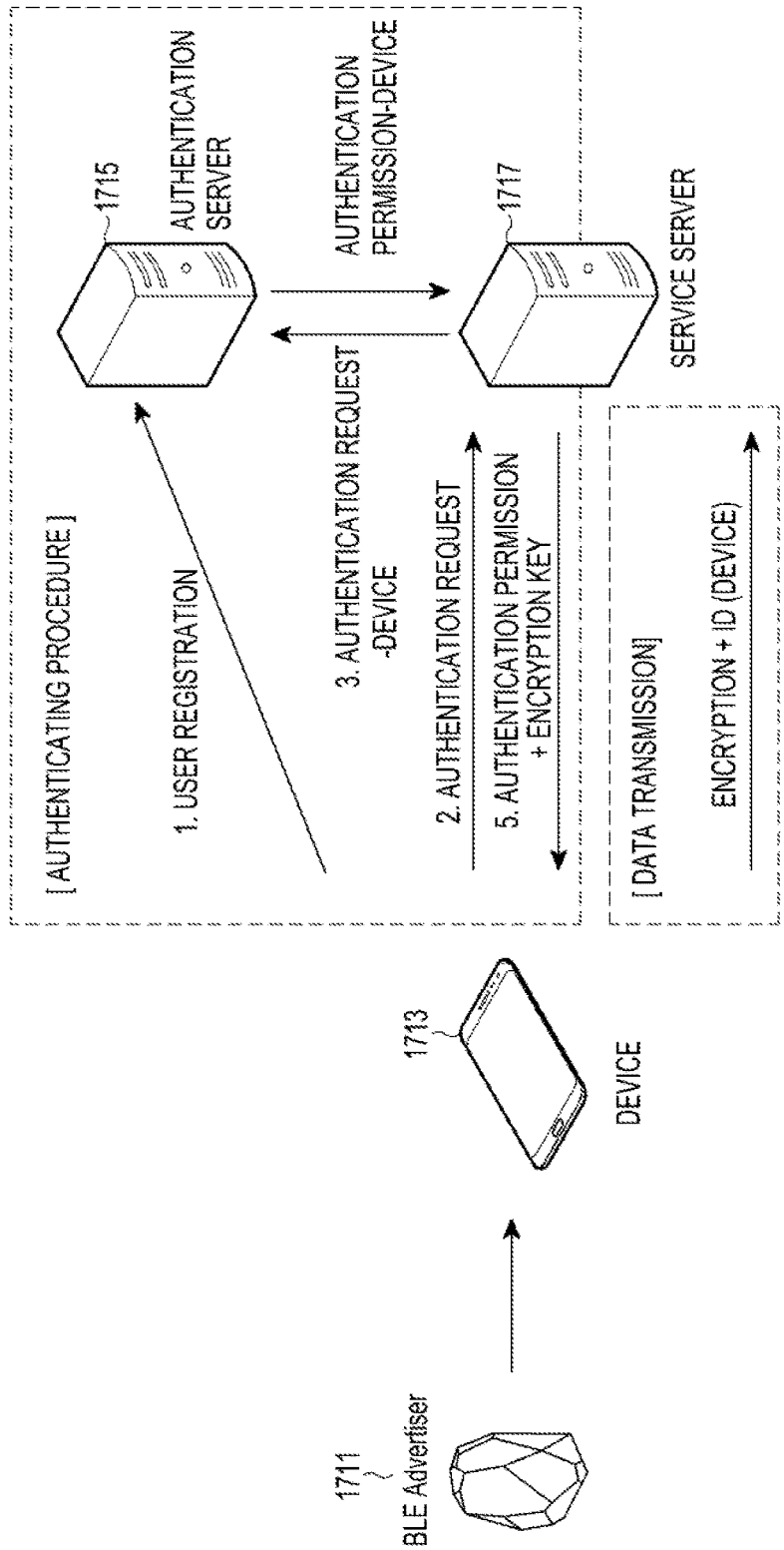
FIG. 17 schematically illustrates an authenticating procedure between a reference device and a server in a wireless communication system supporting a Bluetooth scheme according to an embodiment of the present disclosure.

FIG. 17 schematically illustrates an authenticating procedure between a reference device and a server in a wireless communication system supporting a Bluetooth scheme according to an embodiment of the present disclosure.

Referring to FIG. 17, the wireless communication system includes a BLE advertiser 1711, a device 1713, an authentication server 1715, and a service server 1717.

The device 1713 is a reference device for the BLE advertiser 1711. For example, the BLE advertiser 1711 may be a BLE advertiser which is deployed at a lecture room, and the device 1713 may be a user device which is used by a professor.

The device 1713 performs an authenticating procedure with a server, i.e., the authentication server 1715 and the service server 1717 in advance. That is, the device 1713 performs a user registering operation with the authentication server 1715 in advance, and performs an authenticating procedure with the service server 1717 if necessary. If the user registering operation is completed between the device 1713 and the authentication server 1715, an encryption key is allocated to the device 1713.

The authenticating procedure performed between the device 1713 and the service server 1717 will be described below.

The device 1713 transmits an authentication request message to the service server 1717. After receiving the authentication request message, the service server 1717 transmits an authentication request message for requesting authentication for the device 1713 to the authentication server 1715.

After receiving the authentication request message for requesting the authentication for the device 1713, the authentication server 1715 performs an authenticating operation for the device 1713 based on information on the device 1713 stored at the authentication server 1715. As described above, the authenticating operation for the device 1713 has been performed already, the authentication server 1715 transmits an authentication permission message indicating that the authentication for the device 1713 is permitted to the service server 1717.

After receiving the authentication permission message from the authentication server 1715, the service server 1717 transmits an authentication permission message indicating that the authentication for the device 1713 is permitted to the device 1713. At this time, an encryption key for the device is transmitted along with the authentication permission message.

Upon receiving a BLE advertisement packet, the device 1713 encrypts the BLE advertisement packet based on the received encryption key to transmit the encrypted BLE advertisement packet along with an ID of the device 1713.

If an authenticating procedure is performed as described in FIG. 17, total security performance of the wireless communication system may be enhanced.

An authenticating procedure between a reference device and a server in a wireless communication system supporting a Bluetooth scheme according to an embodiment of the present disclosure has been described with reference to FIG. 17, and an inner structure of a receiving device in a wireless communication system supporting a Bluetooth scheme according to an embodiment of the present disclosure will be described with reference to FIG. 18.

Figure 18:
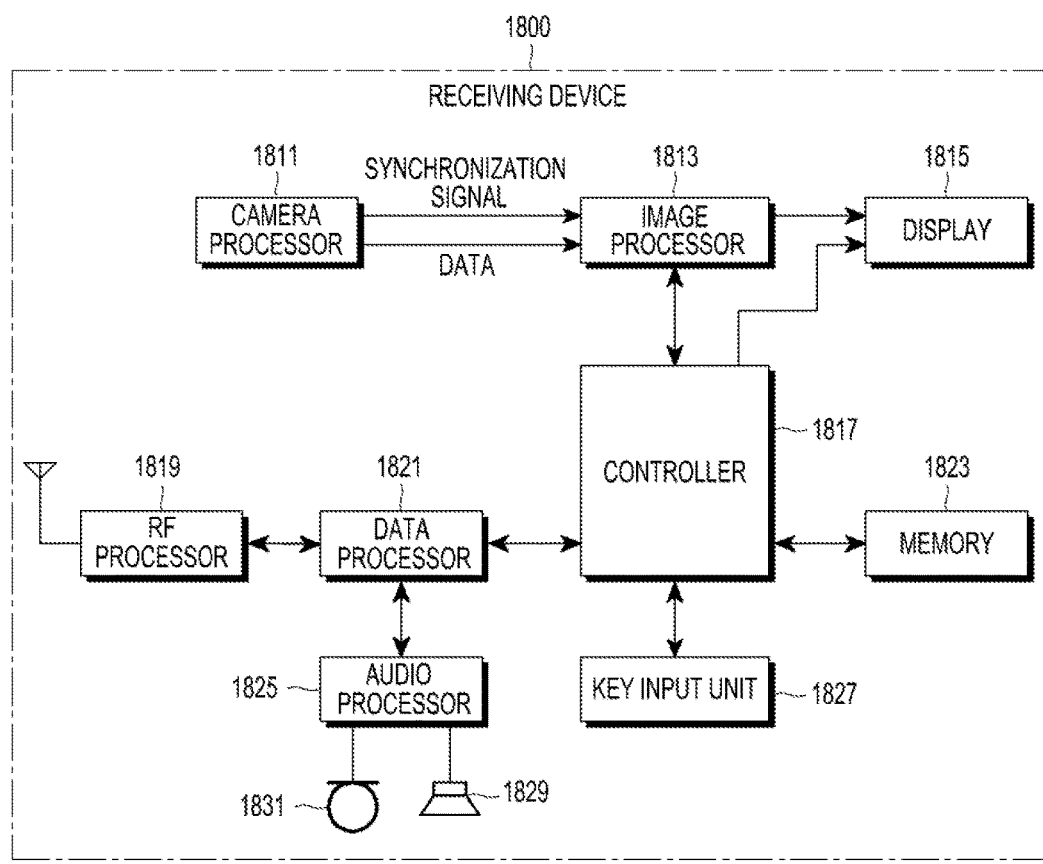
FIG. 18 schematically illustrates an inner structure of a receiving device in a wireless communication system supporting a Bluetooth scheme according to an embodiment of the present disclosure.

FIG. 18 schematically illustrates an inner structure of a receiving device in a wireless communication system supporting a Bluetooth scheme according to an embodiment of the present disclosure.

Referring to FIG. 18, a receiving device 1800 may be connected with an external electronic device (not illustrated in FIG. 18) using at least one of a communication module, a connector, and an earphone connecting jack. The electronic device may include one of various devices which are removable from the receiving device 1800 and are connectible with the receiving device 1800 in a wired manner, such as, for example, an earphone, an external speaker, a universal serial bus (USB) memory, a charging device, a cradle/dock, a digital multimedia broadcasting (DMB) antenna, a mobile payment-related device, a health management device (a blood pressure monitor or the like), a game console, a vehicle navigation device, and so forth.

The external electronic device may be one of a wirelessly connectible Bluetooth communication device, a near field communication (NFC) device, a Wi-Fi direct communication device, a wireless AP, etc. The receiving device 1800 may be connected with a server or another communication device such as, for example, one of a cellular phone, a smart phone, a tablet PC, a desktop PC, and a server, in a wired or wireless manner.

The receiving device 1800 includes a camera processor 1811, an image processor 1813, a display 1815, a controller 1817, a radio frequency (RF) processor 1819, a data processor 1821, a memory 1823, an audio processor 1825, and a key input unit 1827.

The RF processor 1819 is responsible for radio communication of the receiving device 1800. The RF processor 1819 includes an RF transmitter for frequency up-converting transmission signals and amplifying the up-converted signals, and an RF receiver for low-noise-amplifying received signals and frequency down-converting the amplified signals.

The data processor 1821 includes a transmitter for encoding and modulating the transmission signals, and a receiver for demodulating and decoding the received signals. In other words, the data processor 1821 may include a modulator/de-modulator (MODEM) and a coder/decoder (CODEC). The CODEC includes a data CODEC for processing packet data, and an audio CODEC for processing audio signals such as voice.

The audio processor 1825 plays received audio signals output from the audio CODEC in the data processor 1821 using a speaker 1829, and transfers transmission audio signals picked up by a microphone 1831 to the audio CODEC in the data processor 1821.

The key input unit 1827 includes numeric/character keys for inputting numeric and character information and function keys for setting various functions.

A memory 1823 may include a program memory, a data memory, and the like. The program memory may store programs for controlling the general operation of the receiving device 1800. In accordance with an embodiment to the present disclosure, the memory 1823 may store programs related to an operation of detecting a counterfeit BLE advertiser. The data memory may temporarily store the data generated during execution of these programs.

The memory 1823 may be implemented as an arbitrary data storing device such as a read only memory (ROM), a random access memory (RAM), and a memory card (for example, a secure digital (SD) card, and a memory stick).

The memory 1823 may include a non-volatile memory, a volatile memory, a hard disk drive (HDD), or a solid state drive (SSD).

The memory 1823 may also store applications of various functions such as navigation, video communication, games, an alarm application based on time, images for providing a graphic user interface (GUI) related to the applications, user information, documents, databases or data related to a method for processing touch inputs, background images (for example, a menu screen, a standby screen, and so forth), operation programs necessary for driving the receiving device 1800, and images captured by the camera processor 1811.

The memory 1823 is a media which is red though a machine, e.g., a computer. Here, the term "machine-readable medium" includes a medium for providing data to the machine to allow the machine to execute a particular function. The memory 1823 may include non-volatile media and volatile media. Such a medium needs to be of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a compact disc ROM (CD-ROM), an optical disk, a punch card, a paper tape, a RAM, a programmable ROM (PROM), an erasable programmable ROM (EPROM), and a flash-EPROM.

The controller 1817 controls the overall operation of the receiving device 1800. The controller 1817 performs an operation related to an operation of detecting a counterfeit BLE advertiser according to an embodiment of the present disclosure. The operation related to the operation of detecting the counterfeit BLE advertiser according to an embodiment of the present disclosure is performed in the manner described before with reference to FIGS. 1A and 1B and 2 to 17, so a detailed description thereof will be omitted herein. Although the controller 1817 is illustrated as being one unit, it is noted that the controller 1817 may be embodied in one or more processors without departing from the teachings of the disclosure A camera processor 1811 includes a camera sensor for capturing images and converting the captured optical image signal into an electrical signal, and a signal processor for converting the analog image signal captured by the camera sensor into digital data. The camera sensor may be assumed to be a charge-coupled device (CCD) or complementary metal-oxide-semiconductor (CMOS) sensor, and the signal processor may be implemented with a digital signal processor (DSP). The camera sensor and the signal processor may be implemented either in an integrated way, or in a separated way.

The image processor 1813 performs image signal processing (ISP) for displaying the image signals output from the camera processor 1811 on the display 1815. The ISP may include gamma correction, interpolation, spatial variations, image effects, image scaling, automatic white balance (AWB), automatic exposure (AE), and automatic focus (AF). The image processor 1813 processes the image signals output from the camera processor 1811 on a frame-by-frame basis, and outputs the frame image data according to the characteristics and size of the display 1815.

The image processor 1813 includes a video codec, which compresses the frame image data displayed on the display 1815 by a preset coding scheme, and decompresses the compressed frame image data into the original frame image data. The video codec may include a joint photographic experts group (JPEG) codec, a moving picture experts group 4 (MPEG4) codec, and a Wavelet codec. The image processor 1813 is assumed to have an on-screen display (OSD) function, and may output OSD data according to the size of the displayed screen, under control of the controller 1817.

The display 1815 displays, on its screen, image signals output from the image processor 1813 and user data output from the controller 1817. The display 1815 may include a liquid crystal display (LCD). In this case, the display 1815 may include an LCD controller, a memory capable of storing image data, and an LCD panel. When implemented in a touch screen manner, the LCD may serve as an input unit. In this case, the same keys as those on the key input unit 1827 may be displayed on the display 1815.

If the display 1815 is implemented as the touch screen, the display 1815 outputs an analog signal, which corresponds to at least one input to a user graphic interface, to the controller 1817.

The display 1815 receives at least one user inputs through a user's body (for example, a finger including a thumb) or the key input unit 1827 (for example, a stylus pen or an electronic pen).

The display 1815 receives continuous motions on one touch (for example, a drag). The display 1815 outputs an analog signal corresponding to the continuous motions to the controller 1817.

In an embodiment of the present disclosure, a touch may also include a non-contact touch (for example, when the user input means is positioned within a distance of, for example, 1 cm) in which the user input means may be detected without a direct contact with the display 1815. The touch may also include a direct contact between the display 1815 and a finger or the key input unit 1827. A distance or interval from the display 1815 within which the user input means may be detected may be changed according to the capability or structure of the receiving device 1800. In particular, to separately detect a direct touch event based on a contact with the user input means and an indirect touch event (that is, a hovering event), the display 1815 may be configured to output different values for values (for example, an analog voltage value or current value) detected in the direct touch event and the hovering event.

The display 1815 may be implemented as, for example, a resistive type, a capacitive type, an infrared type, an acoustic wave type, or a combination thereof.

The display 1815 may include at least two touch panels capable of sensing a touch, an approach of a finger, or the key input unit 1827 to receive inputs generated by the finger or the key input unit 1827. The at least two touch panels provide different output values to the controller 1817. Thus, the controller 1817 differently recognizes the values input from the at least two touch screen panels to identify whether the input from the display 1815 is the input generated by the finger or by the key input unit 1827.

The controller 1817 converts the analog signal received from the display 1815 into a digital signal and controls the display 1815 using the digital signal. For example, the controller 1817 may control a shortcut icon (not illustrated in FIG. 18) displayed on the display 1815 to be selected or executed in response to a direct touch event or a hovering event.

The controller 1817, by detecting a value (for example, an electric-current value) output through the display 1815, recognizes a hovering interval or distance as well as a user input position and converts the recognized distance into a digital signal (for example, a Z coordinate). The controller 1817 may also, by detecting the value output through the display 1815, detect a pressure applied by the user input means to the display 1815, and convert the detected pressure into a digital signal.

While the camera processor 1811, the image processor 1813, the display 1815, the controller 1817, the RF processor 1819, the data processor 1821, the memory 1823, the audio processor 1825, and the key input unit 1827 are shown in FIG. 18 as separate units, it is to be understood that this is for merely convenience of description. In other words, two or more of the camera processor 1811, the image processor 1813, the display 1815, the controller 1817, the RF processor 1819, the data processor 1821, the memory 1823, the audio processor 1825, and the key input unit 1827 may be incorporated into a single unit.

Alternatively, the receiving device 1800 may be implemented with one processor.

An inner structure of a receiving device in a wireless communication system supporting a Bluetooth scheme according to an embodiment of the present disclosure has been described with reference to FIG. 18, and an inner structure of a BLE advertiser in a wireless communication system supporting a Bluetooth scheme according to an embodiment of the present disclosure will be described with reference to FIG. 19.

Figure 19:
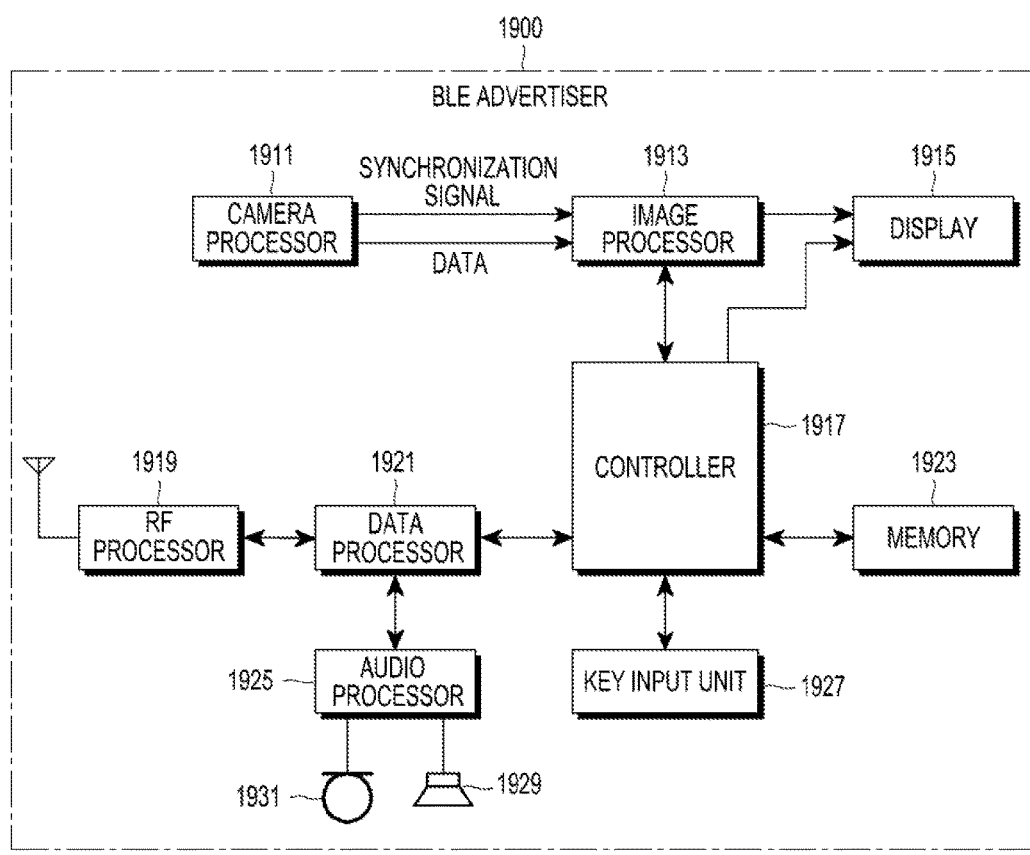
FIG. 19 schematically illustrates an inner structure of a BLE advertiser in a wireless communication system supporting a Bluetooth scheme according to an embodiment of the present disclosure.

FIG. 19 schematically illustrates an inner structure of a BLE advertiser in a wireless communication system supporting a Bluetooth scheme according to an embodiment of the present disclosure.

Referring to FIG. 19, a BLE advertiser 1900 includes a camera processor 1911, an image processor 1913, a display 1915, a controller 1917, an RF processor 1919, a data processor 1921, a memory 1923, an audio processor 1925, and a key input unit 1927.

Each of the camera processor 1911, the image processor 1913, the display 1915, the controller 1917, the RF processor 1919, the data processor 1921, the memory 1923, the audio processor 1925, the key input unit 1927, the speaker 1929, and the microphone 1931 performs an operation similar to an operation of each of the camera processor 1811, the image processor 1813, the display 1815, the controller 1817, the RF processor 1819, the data processor 1821, the memory 1823, the audio processor 1825, and the key input unit 1827, the speaker 1829, and the microphone 1831 illustrated in FIG. 18, so a description thereof will be omitted herein.

Further, the controller 1917 and the memory 1923 will be described below.

A memory 1923 may include a program memory, a data memory, and the like. The program memory may store programs for controlling the general operation of the BLE advertiser 1900. In accordance with an embodiment to the present disclosure, the memory 1923 may store programs related to an operation of detecting a counterfeit BLE advertiser. The data memory may temporarily store the data generated during execution of these programs.

The controller 1917 controls the overall operation of the BLE advertiser 1900. The controller 1917 performs an operation related to an operation of detecting a counterfeit BLE advertiser according to an embodiment of the present disclosure. The operation related to the operation of detecting the counterfeit BLE advertiser according to an embodiment of the present disclosure is performed in the manner described before with reference to FIGS. 1A and 1B, and FIGS. 2 to 17, so a detailed description thereof will be omitted herein. Although the controller 1917 is illustrated as being one unit, it is noted that the controller 1917 may be embodied in one or more processors without departing from the teachings of the disclosure While the camera processor 1911, the image processor 1913, the display 1915, the controller 1917, the RF processor 1919, the data processor 1921, the memory 1923, the audio processor 1925, and the key input unit 1927 are shown in FIG. 19 as separate units, it is to be understood that this is for merely convenience of description. In other words, two or more of the camera processor 1911, the image processor 1913, the display 1915, the controller 1917, the RF processor 1919, the data processor 1921, the memory 1923, the audio processor 1925, and the key input unit 1927 may be incorporated into a single unit.

Alternatively, the BLE advertiser 1900 may be implemented with one processor.

An inner structure of a BLE advertiser in a wireless communication system supporting a Bluetooth scheme according to an embodiment of the present disclosure has been described with reference to FIG. 19, and an inner structure of a server in a wireless communication system supporting a Bluetooth scheme according to an embodiment of the present disclosure will be described with reference to FIG. 20.

Figure 20:
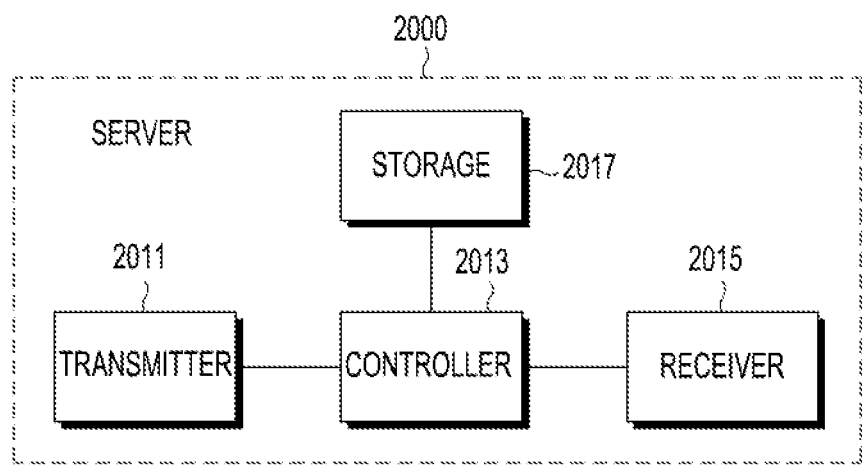
FIG. 20 schematically illustrates an inner structure of a server in a wireless communication system supporting a Bluetooth scheme according to an embodiment of the present disclosure.

FIG. 20 schematically illustrates an inner structure of a server in a wireless communication system supporting a Bluetooth scheme according to an embodiment of the present disclosure.

Referring to FIG. 20, a server 2000 includes a transmitter 2011, a controller 2013, a receiver 2015, and a storage 2017.

The controller 2013 controls the overall operation of the server 2000. More particularly, the controller 2013 controls the server 2000 to perform an operation related to an operation of detecting a counterfeit BLE advertiser according to an embodiment of the present disclosure. The operation related to the operation of detecting the counterfeit BLE advertiser according to an embodiment of the present disclosure is performed in the manner described with reference to FIGS. 1A and 1B and 2 to 17, and a description thereof will be omitted herein.

The transmitter 2011 transmits various signals and various messages, and the like to a receiving device, a BLE advertiser, and the like included in the wireless communication system under a control of the controller 2013. The various signals, the various messages, and the like transmitted in the transmitter 2011 have been described in FIGS. 1A and 1B and 2 to 17 and a description thereof will be omitted herein.

The receiver 2015 receives various signals, various messages, and the like from the receiving device, the BLE advertiser, and the like included in the wireless communication system under a control of the controller 2013. The various signals, the various messages, and the like received in the receiver 2015 have been described in FIGS. 1A and 1B and 2 to 17 and a description thereof will be omitted herein.

The storage 2017 stores a program related to an operation related to an operation of detecting a counterfeit BLE advertiser according to an embodiment of the present disclosure which the server 2000 performs under a control of the controller 2013, various data, and the like.

The storage 2017 stores the various signals and the various messages which the receiver 2015 receives from the receiving device, the BLE advertiser, and the like.

While the transmitter 2011, the controller 2013, the receiver 2015, and the storage 2017 are shown in FIG. 20 as separate units, it is to be understood that this is merely for convenience of description. In other words, two or more of the transmitter 2011, the controller 2013, the receiver 2015, and the storage 2017 may be incorporated into a single unit. The server 2000 may be implemented with one processor.

An inner structure of a server in a wireless communication system supporting a Bluetooth scheme according to an embodiment of the present disclosure has been described with reference to FIG. 20, and an inner structure of a scanner in a wireless communication system supporting a Bluetooth scheme according to an embodiment of the present disclosure will be described with reference to FIG. 21.

Figure 21:
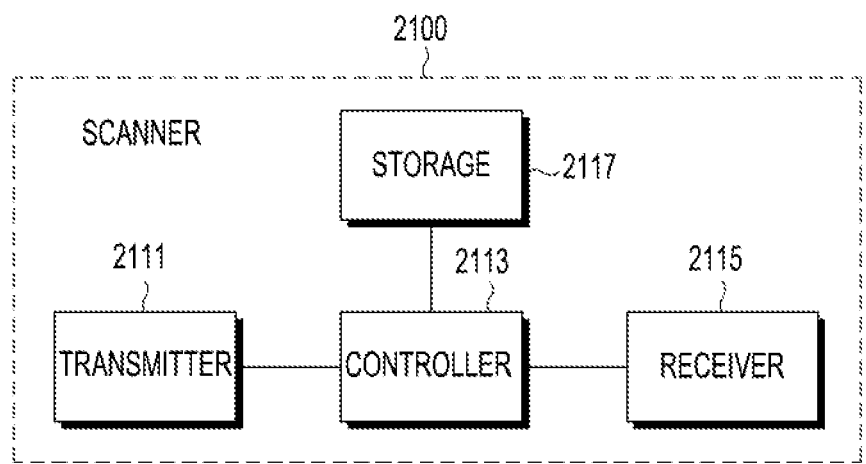
FIG. 21 schematically illustrates an inner structure of a scanner in a wireless communication system supporting a Bluetooth scheme according to an embodiment of the present disclosure.

FIG. 21 schematically illustrates an inner structure of a scanner in a wireless communication system supporting a Bluetooth scheme according to an embodiment of the present disclosure.

Referring to FIG. 21, a scanner 2100 includes a transmitter 2111, a controller 2113, a receiver 2115, and a storage 2117.

The controller 2113 controls the overall operation of the scanner 2100. More particularly, the controller 2113 controls the scanner 2100 to perform an operation related to an operation of detecting a counterfeit BLE advertiser according to an embodiment of the present disclosure. The operation related to the operation of detecting the counterfeit BLE advertiser according to an embodiment of the present disclosure is performed in the manner described with reference to FIGS. 1A and 1B and 2 to 17, and a description thereof will be omitted herein.

The transmitter 2111 transmits various signals and various messages, and the like to a receiving device, a BLE advertiser, a server, and the like included in the wireless communication system under a control of the controller 2113. The various signals, the various messages, and the like transmitted in the transmitter 2111 have been described in FIGS. 1A and 1B and 2 to 17 and a description thereof will be omitted herein.

The receiver 2115 receives various signals, various messages, and the like from the receiving device, the BLE advertiser, the server, and the like included in the wireless communication system under a control of the controller 2113. The various signals, the various messages, and the like received in the receiver 2115 have been described in FIGS. 1A and 1B and 2 to 17 and a description thereof will be omitted herein.

The storage 2117 stores a program related to an operation related to an operation of detecting a counterfeit BLE advertiser according to an embodiment of the present disclosure which the scanner 2100 performs under a control of the controller 2113, various data, and the like.

The storage 2117 stores the various signals and the various messages which the receiver 2115 receives from the receiving device, the BLE advertiser, the server, and the like.

While the transmitter 2111, the controller 2113, the receiver 2115, and the storage 2117 are described in the scanner 2100 as separate units, it is to be understood that this is merely for convenience of description. In other words, two or more of the transmitter 2111, the controller 2113, the receiver 2115, and the storage 2117 may be incorporated into a single unit. The scanner 2100 may be implemented with one processor.

In accordance with various embodiments of the present disclosure, a method for detecting a counterfeit advertiser by a server in a wireless communication system is provided. The method includes detecting random delay time or a cumulative interval for a reference device based on a time stamp for an advertisement packet which is received from the receiving device; detecting random delay time or a cumulative interval for a receiving device other than the reference device based on a time stamp for an advertisement packet which is received from the receiving device; and determining whether an advertiser which broadcasts the advertisement packet received from the receiving device is a counterfeit advertiser based on the random delay time for the reference device and the random delay time for the receiving device, or determining whether an advertiser which broadcasts the advertisement packet received from the receiving device is a counterfeit advertiser based on the cumulative interval for the reference device and the cumulative interval for the receiving device.

In an implementation, the determining whether the advertiser which broadcasts the advertisement packet received from the receiving device is the counterfeit advertiser based on the random delay time for the reference device and the random delay time for the receiving device comprises determining the advertiser which broadcasts the advertisement packet received from the receiving device as the counterfeit advertiser if difference between the random delay time for the reference device and the random delay time for the receiving device is equal to or greater than a certain threshold time.

In an implementation, the method further includes transmitting, to the receiving device, a counterfeit alert packet alerting that the advertiser which broadcasts the advertisement packet received from the receiving device is the counterfeit advertiser if the advertiser which broadcasts the advertisement packet received from the receiving device is the counterfeit advertiser.

In an implementation, the detecting the random delay time for the reference device based on the time stamp for the advertisement packet which is received from the receiving device comprises detecting the random delay time for the reference device based on a time stamp for an advertisement packet which is received in the reference device at first time, a time stamp for an advertisement packet which is received in the reference device at second time, and an advertisement interval supported in the wireless communication system, and the advertisement interval denotes a period by which at least one advertisement channel is set.

In an implementation, the time stamp received from the reference device indicates time at which the reference device has completed a processing operation for the advertisement packet.

In an implementation, the detecting the random delay time for the receiving device based on the time stamp for the advertisement packet which is received from the reference device comprises detecting the random delay time for the receiving device based on a time stamp for an advertisement packet which is received in the receiving device at first time, a time stamp for an advertisement packet which is received in the receiving device at second time, and an advertisement interval supported in the wireless communication system, and the advertisement interval denotes a period by which at least one advertisement channel is set.

In an implementation, the time stamp received from the receiving device indicates time at which the receiving device has completed a processing operation for the advertisement packet.

In an implementation, the reference device is a device which guarantee to receive an advertisement packet from an original advertiser.

In an implementation, the determining whether the advertiser which broadcasts the advertisement packet which is received from the receiving device is the counterfeit advertiser based on the cumulative interval for the reference device and the cumulative interval for the receiving device comprises determining the advertiser which broadcasts the advertisement packet received from the receiving device as the counterfeit advertiser if difference between the cumulative interval for the reference device and the cumulative interval for the receiving device is equal to or greater than a certain threshold time.

In an implementation, the detecting the cumulative interval for the reference device based on the time stamp for the advertisement packet received from the reference device comprises detecting an interval that cumulative random delay time generated based on time stamps for advertisement packets received in the reference device is equal to an advertisement interval as the cumulative interval, and the advertisement interval denotes a period by which at least one advertisement channel is set.

In an implementation, the detecting the cumulative interval for the receiving device based on the time stamp for the advertisement packet received from the reference device comprises detecting an interval that cumulative random delay time generated based on time stamps for advertisement packets received in the receiving device is equal to an advertisement interval as the cumulative interval, and the advertisement interval denotes a period by which at least one advertisement channel is set.

In accordance with various embodiments of the present disclosure, an operating method of a reference device in a wireless communication system is provided. The operating method includes receiving an advertisement packet broadcasted by an original advertiser; and transmitting the advertisement packet and a time stamp for the advertisement packet to a server.

In an implementation, the time stamp indicates time at which a processing operation for the advertisement packet has been completed.

In an implementation, the reference device is a device which guarantees to receive an advertisement packet from an original advertiser.

In accordance with various embodiments of the present disclosure, an operating method of a receiving device in a wireless communication system is provided. The operating method includes receiving an advertisement packet broadcasted by an advertiser; transmitting the advertisement packet and a time stamp for the advertisement packet to a server; and receiving a counterfeit alert packet alerting that the advertiser is a counterfeit advertiser from the server.

In an implementation, the time stamp indicates time at which a processing operation for the advertisement packet has been completed.

In an implementation, the counterfeit alert packet is transmitted when the server determines the advertiser as the counterfeit advertiser if difference between random delay time for a reference device and random delay time for the receiving device is equal to or greater than a threshold time, the server determines the random delay time for the reference device based on a time stamp for an advertisement packet received from the reference device, and the server determines the random delay time for the receiving device based on a time stamp for an advertisement packet received from the receiving device.

In an implementation, the reference device is a device which guarantees to receive an advertisement packet from an original advertiser.

In an implementation, the counterfeit alert packet is transmitted when the server determines the advertiser as the counterfeit advertiser if difference between a cumulative interval for a reference device and a cumulative interval for the receiving device is equal to or greater than a threshold time, the server determines the cumulative interval for the reference device based on time stamps for advertisement packets received from the reference device, and the server determines the cumulative interval for the receiving device based on time stamps for advertisement packets received from the receiving device.

In an implementation, the cumulative interval for the reference device is an interval that cumulative random delay time generated based on time stamps for advertisement packets received in the reference device is equal to an advertisement interval, the cumulative interval for the receiving device is an interval that cumulative random delay time generated based on time stamps for advertisement packets received in the receiving device is equal to the advertisement interval, and the advertisement interval denotes a period by which at least one channel is set.

In accordance with various embodiments of the present disclosure, an operating method of an original advertiser in a wireless communication system is provided. The operating method includes broadcasting an advertisement packet to cause a reference scanner which receives the advertisement packet to transmit the advertisement packet and a time stamp for the advertisement packet to a server.

In an implementation, the time stamp indicates time at which a processing operation for the advertisement packet has been completed.

In accordance with various embodiments of the present disclosure, an original advertiser in a wireless communication system is provided. The original advertiser includes a processor configured to broadcast an advertisement packet to cause a reference scanner which receives the advertisement packet to transmit the advertisement packet and a time stamp for the advertisement packet to a server.

In an implementation, the time stamp indicates time at which a processing operation for the advertisement packet has been completed.

As is apparent from the foregoing description, an embodiment of the present disclosure enables to detect a counterfeit advertiser in a wireless communication system.

An embodiment of the present disclosure enables to detect a counterfeit advertiser thereby enhancing security in a wireless communication system.

An embodiment of the present disclosure enables to detect a counterfeit advertiser based on random delay time in a wireless communication system.

An embodiment of the present disclosure enables to detect a counterfeit advertiser based on a time stamp in a wireless communication system.

An embodiment of the present disclosure enables to detect a counterfeit advertiser without changing a format of an existing advertisement packet in a wireless communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include ROM, RAM, compact disk ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A server in a wireless communication system, the server comprising:
   at least one processor configured to:
   detect a random delay time or a cumulative interval for a reference device based on a time stamp for an advertisement packet which is received from the reference device,
   detect a random delay time or a cumulative interval for a receiving device other than the reference device based on a time stamp for an advertisement packet which is received from the receiving device,
   determine whether an advertiser which broadcasts the advertisement packet received from the receiving device is a counterfeit advertiser based on the random delay time for the reference device and the random delay time for the receiving device, or
   determine whether the advertiser which broadcasts the advertisement packet received from the receiving device is a counterfeit advertiser based on the cumulative interval for the reference device and the cumulative interval for the receiving device.

2. The server of claim 1, wherein the at least one processor is further configured to determine that the advertiser which broadcasts the advertisement packet received from the receiving device as the counterfeit advertiser if a difference between the random delay time for the reference device and the random delay time for the receiving device is equal to or greater than a threshold time.

3. The server of claim 1, further comprising a transmitter,
wherein the at least one processor is further configured to control the transmitter to transmit, to the receiving device, a counterfeit alert packet alerting that the advertiser which broadcasts the advertisement packet received from the receiving device is the counterfeit advertiser if the advertiser which broadcasts the advertisement packet received from the receiving device is the counterfeit advertiser.

4. The server of claim 1,
wherein the at least one processor is further configured to detect the random delay time for the reference device based on a time stamp for an advertisement packet which is received in the reference device at a first time, a second time stamp for an advertisement packet which is received in the reference device at a second time, and an advertisement interval supported in the wireless communication system, and
wherein the advertisement interval denotes a period by which at least one advertisement channel is set.

5. The server of claim 1, wherein the time stamp received from the reference device indicates a time at which the reference device has completed a processing operation for the advertisement packet.

6. The server of claim 1,
wherein the at least one processor is further configured to detect the random delay time for the receiving device based on a time stamp for an advertisement packet which is received in the receiving device at a first time, a second time stamp for an advertisement packet which is received in the receiving device at a second time, and an advertisement interval supported in the wireless communication system, and
wherein the advertisement interval denotes a period by which at least one advertisement channel is set.

7. The server of claim 1, wherein the time stamp received from the receiving device indicates a time at which the receiving device has completed a processing operation for the advertisement packet.

8. The server of claim 1, wherein the reference device is guaranteed to receive an advertisement packet from an original advertiser.

9. The server of claim 1, wherein the at least one processor is further configured to determine that the advertiser which broadcasts the advertisement packet which is received from the receiving device as the counterfeit advertiser if a difference between the cumulative interval for the reference device and the cumulative interval for the receiving device is equal to or greater than a threshold time.

10. The server of claim 1,
wherein the at least one processor is further configured to detect an interval that a cumulative random delay time generated based on time stamps for advertisement packets received in the reference device is equal to an advertisement interval as the cumulative interval, and
wherein the advertisement interval denotes a period by which at least one advertisement channel is set.

11. The server of claim 1,
wherein the at least one processor is further configured to detect an interval that a cumulative random delay time generated based on time stamps for advertisement packets received in the receiving device is equal to an advertisement interval as the cumulative interval, and
wherein the advertisement interval denotes a period by which at least one advertisement channel is set.

12. A reference device in a wireless communication system, the reference device comprising:
a receiver;
a transmitter; and
at least one processor configured to:
control the receiver to receive an advertisement packet broadcasted by an original advertiser,
generate a time stamp corresponding to a time at which the receiver receives the advertisement packet, and
control the transmitter to transmit the advertisement packet and the time stamp to a server,
wherein a counterfeit alert packet is transmitted from the server to a receiving device when the server determines an advertiser as the counterfeit advertiser if a difference between a random delay time for the reference device and a random delay time for the receiving device is equal to or greater than a threshold time.

13. The reference device of claim 12, wherein the time stamp indicates a time at which an operation for processing the advertisement packet has been completed.

14. The reference device of claim 12, wherein the reference device is a device which guarantees to receive an advertisement packet from an original advertiser.

15. A receiving device in a wireless communication system, the receiving device comprising:
a receiver;
a transmitter; and
at least one processor configured to:
control the receiver to receive an advertisement packet broadcasted by an advertiser,
generate a time stamp corresponding to a time at which the receiver receives the advertisement packet,
control the transmitter to transmit the advertisement packet and the time stamp to a server, and
control the receiver to receive a counterfeit alert packet alerting that the advertiser is a counterfeit advertiser from the server,
wherein the counterfeit alert packet is transmitted when the server determines the advertiser as the counterfeit advertiser if a difference between a random delay time for a reference device and a random delay time for the receiving device is equal to or greater than a threshold time.

16. The receiving device of claim 15, wherein the time stamp indicates a time at which an operation for processing the advertisement packet has been completed.

17. The receiving device of claim 15,
wherein the server determines the random delay time for the reference device based on a time stamp for an advertisement packet received from the reference device, and
wherein the server determines the random delay time for the receiving device based on a time stamp for an advertisement packet received from the receiving device.

18. The receiving device of claim 17, wherein the reference device is a device which guarantees to receive an advertisement packet from an original advertiser.

19. The receiving device of claim 15,
wherein the counterfeit alert packet is transmitted when the server determines the advertiser as the counterfeit advertiser if a difference between a cumulative interval for a reference device and a cumulative interval for the receiving device is equal to or greater than a threshold time,
wherein the server determines the cumulative interval for the reference device based on time stamps for advertisement packets received from the reference device, and
wherein the server determines the cumulative interval for the receiving device based on time stamps for advertisement packets received from the receiving device.

20. The receiving device of claim 19,
wherein the cumulative interval for the reference device is an interval that cumulative random delay time generated based on time stamps for advertisement packets received in the reference device is equal to an advertisement interval,
wherein the cumulative interval for the receiving device is an interval that cumulative random delay time generated based on time stamps for advertisement packets received in the receiving device is equal to the advertisement interval, and
wherein the advertisement interval denotes a period by which at least one channel is set.

* * * * *